June 30, 1970  V. G. CONVERSE III, ET AL  3,517,552
APPARATUS FOR TESTING CARBURETORS
Filed Sept. 14, 1967  9 Sheets-Sheet 1
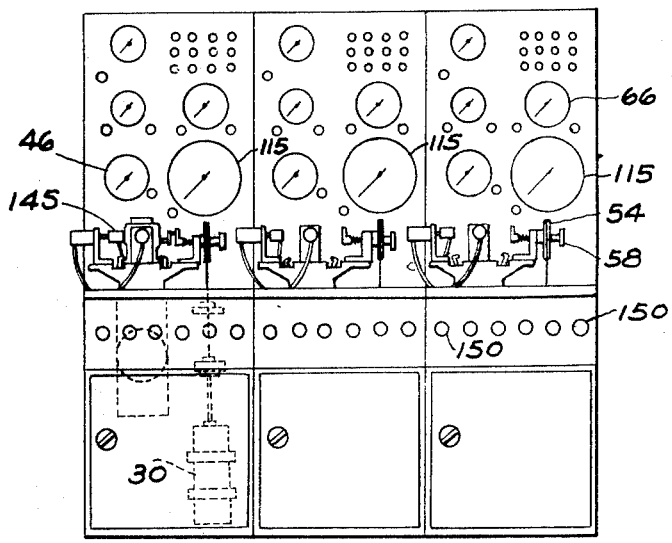
Fig.1
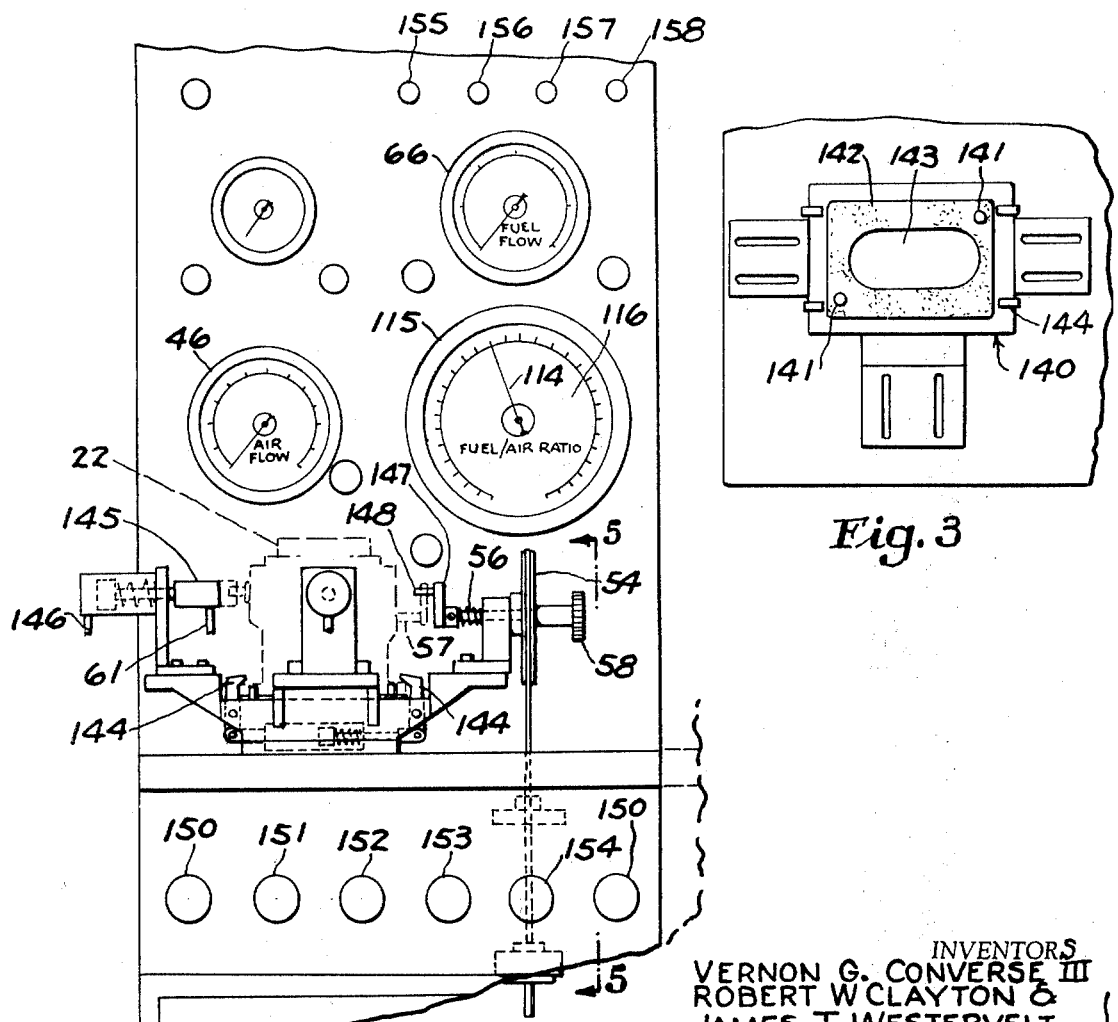
Fig.2
Fig.3
INVENTORS
VERNON G. CONVERSE III
ROBERT W. CLAYTON &
JAMES T. WESTERVELT
BY Gregory S. Dolgorukov
ATTORNEY

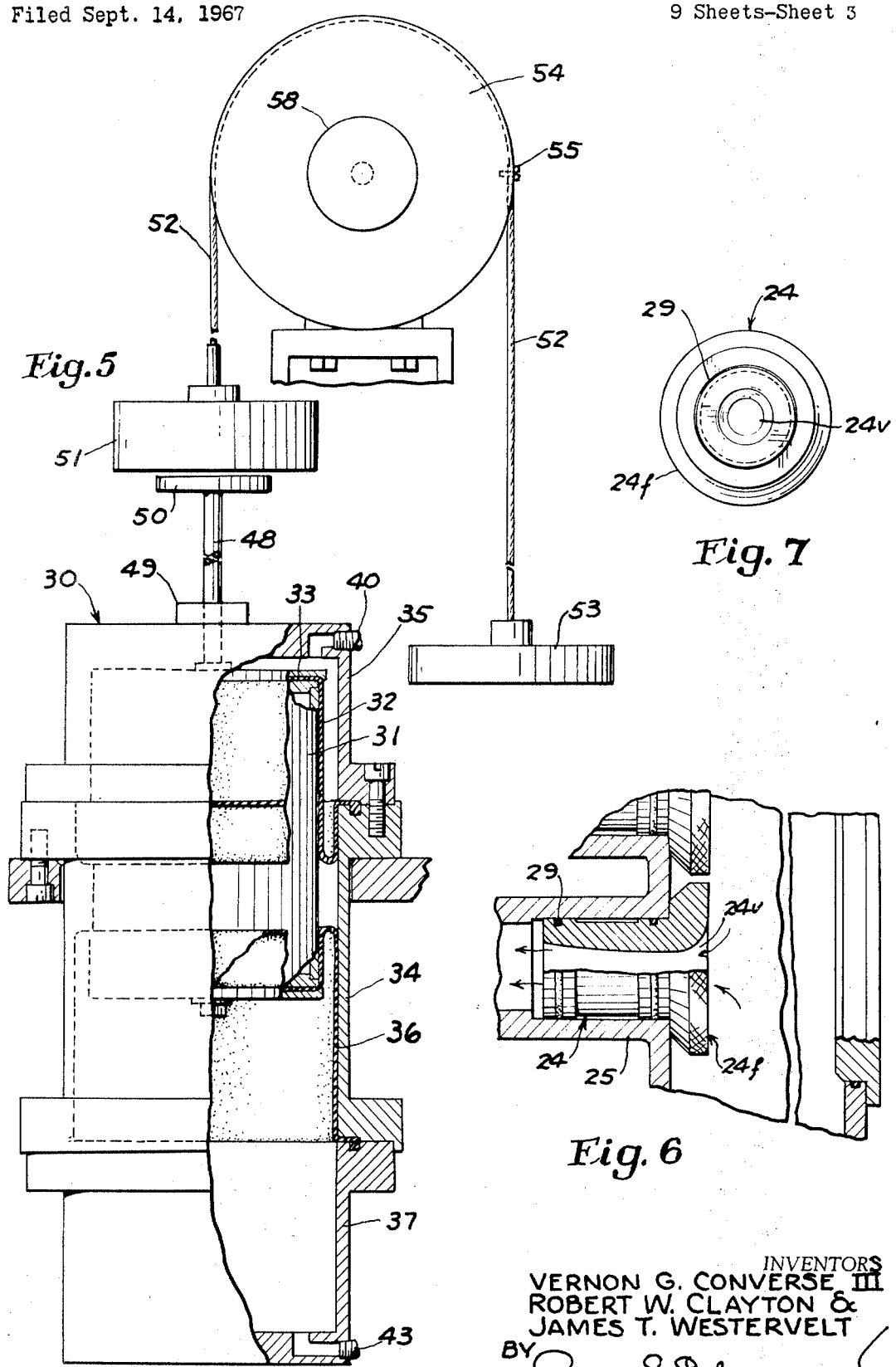

INVENTORS
VERNON G. CONVERSE III
ROBERT W. CLAYTON &
JAMES T. WESTERVELT
BY Gregory S. Dolgorukov
ATTORNEY.

INVENTORS
VERNON G. CONVERSE III
ROBERT W. CLAYTON &
JAMES T. WESTERVELT
BY Gregory S. Dolgorukov
ATTORNEY.

June 30, 1970 V. G. CONVERSE III, ET AL 3,517,552
APPARATUS FOR TESTING CARBURETORS
Filed Sept. 14, 1967 9 Sheets-Sheet 7

INVENTORS
VERNON G. CONVERSE III
ROBERT W. CLAYTON &
JAMES T. WESTERVELT
BY Gregory S. Dolgorukov
ATTORNEY June 30, 1970 V. G. CONVERSE III, ET AL 3,517,552
APPARATUS FOR TESTING CARBURETORS
Filed Sept. 14, 1967 9 Sheets-Sheet 9

INVENTORS
VERNON G. CONVERSE III
ROBERT W. CLAYTON &
JAMES T. WESTERVELT
BY
Gregory S. Dolgorukov
ATTORNEY.

United States Patent Office 3,517,552
Patented June 30, 1970

3,517,552
APPARATUS FOR TESTING CARBURETORS
Vernon G. Converse III, Franklin, Robert W. Clayton, Plymouth, and James T. Westervelt, Livonia, Mich., assignors to Scans Associates, Inc., Livonia, Mich., a corporation of Michigan
Filed Sept. 14, 1967, Ser. No. 667,711
Int. Cl. G01m *15/00*
U.S. Cl. 73—118        12 Claims

ABSTRACT OF THE DISCLOSURE

The application discloses method and apparatus for testing carburetors for their performance and giving simultaneously with the test continuous and direct indication of the mixture ratio produced by a test carburetor as well as deviations of such mixture from prescribed standard. The apparatus is adapted to reproduce in a tested carburetor a predetermined air flow and manifold vacuum known to occur in such carburetors at a certain point of its operation. With such air flow inducing a definite fuel flow in the test carburetor, the rate of fuel flow is measured and amplified. The signals produced by the measuring devices, which signals may be pneumatic, electric, or hydraulic, are impressed on an analog computer capable of dividing one value by the other and thus to produce another signal related to or representative of the mixture ratio produced by the carburetor. Such ratio is indicated on a specially graduated pressure indicating device, or an electric indicating device, and thus giving a direct and continuous reading of the mixture ratio produced by the carburetor. By virtue of many additional improvements, the apparatus is made suitable for rapid but precise testing of carburetors on a production line making such test one of manufacturing operations. For such purposes, indications may be of such character as to indicate the degree of deviations of the test carburetors from the prescribed standard for the purpose of accepting or rejecting a carburetor rather than to give exact value for the mixture ratios.

---

This invention relates to test systems and more particularly to improved method and apparatus for testing carburetors.

The unprecedented increase in the number of motor vehicles operating on the highways of this country has been reaching in many localities a near saturation point. With virtually all such behicles using gasoline engines, the exhaust from the vehicle engines reaches such proportions as to affect under some atmospheric conditions purity of the air in such substantial degree as to affect health and comfort of the population, particularly in large cities. Such phenomena together with other similar causes pose a serious problem for the country, which problem is usually referred to as "air pollution."

It has been found that the degree of air pollution caused by an automobile engine depends in a large measure on the combustion of fuel. Complete or near complete combustion leaving no unburned hydrocarbon fuel or CO gas is the most desired or optimum condition. While such condition is not fully attainable, approaching it as closely as possible constitutes an important objective as a measure which could decrease air pollution in a substantial degree.

Incomplete or improper combustion in an automobile engine results from and is affected by numerous factors of which carburetors is one of the most important. Carburetor is a device which controls the amount of air and fuel mixture admitted to the engine and the proportion of air to fuel in such mixture. Carburetor is a device comprising in general five systems. These systems are:

(1) the main metering system
(2) the idling system
(3) the power enrichment system
(4) the mixture control system, and
(5) the acceleration system These systems are, in effect, separate devices connected together and intended to cooperate in such a manner as to provide a corrected mixture ratio for special conditions such as idling or acceleration.

The design of a carburetor, within which such systems are assembled into a unitary construction, may greatly affect operation of such separate systems and produce their improper operation at certain points of the operation range of the carburetor, or through the entire such range. This, in turn, may greatly affect combustion process taking place in the engine and, therefore, the nature of the exhaust produced by the engine.

The public effort to reduce air pollution and the urgency of this problem resulted in passing certain laws and regulations the effect of which bears on the air-fuel ratios of the combustible mixture through the operation range of carburetors. Such specifications are given in the form determining specified tolerances in carburetor performance. These specifications prescribe permissible maximum deviations from prescribed mixture ratios at various points of the operation range of the carburetor. At the present time, for convenience of testing, the points at which mixture ratio deviations are prescribed, are usually as follows:

(a) idling
(b) off idling
(c) part throttle
(d) wide-open throttle

In the past, due to the fact that the concern of those skilled in the art was primarily production of power, acceleration and maximum speed, and to some extent miles per gallon of fuel rather than elimination of air pollution, and no legal standards bearing on the nature of combustible mixtures had been established, deviations were rather high, being in the neighborhood of plus-minus 6%–9% from the present standards, with the deviation caused by overrich mixtures prevailing.

With the rising public concern regarding air pollution, known to result in a large measure from overrich mixtures and incomplete combustion, the standards set by governmental agencies have been more precise, and deviations therefrom have been considerably narrowed as to their respective ranges. For example, in the idling setting of a carburetor, which is the most critical point of ratio deviations, with the fuel flow being .01–.2 lbs./minute, permissible deviation may be only plus-minus 2%. With other carburetor settings, the rates of fuel flow and permissible deviations may be somewhat higher.

It should be appreciated that a mixture ratio may be expressed as a air-fuel ratio or as fuel-air ratio and written as ratio, as a common fraction, or as a decimal. The mixture ratios which are used for the purposes of comparison and are discussed herein, are the pounds of air to pounds of fuel, and are referred to as air-fuel ratios.

In the past, such ratios could be determined, in effect, by laboratory methods only. The tests made in accordance with such methods were exceedingly slow, were limited to laboratory equipment and conditions, were not continuous and were not susceptible of being made a production operation, such as required for testing each and every carburetor on a production line.

Such conditions were due to the fact that the ratios for each carburetor at each point of its operation range or throttle position had to be determined by direct measurements of the fuel drawn by the carburetor during a measured time period at a given flow of air. In order to produce a definite and controlled flow of air, such flow had to be of a subsonic character controlled by a suitable valve, and the measurements of fuel flow be made directly such as by measuring the volume of fuel consumed from a graduated glass container, or by the use of a specially calibrated flow measuring device. The ratio would then be determined by computations and compared with the prescribed standard limits. As mentioned above, such methods are intermittent or periodic and they are not suitable for rapid production testing.

Attempts to make such tests under new specifications have not been practicable since deviations in the rates of fuel flow at normal ranges at which tests are made are so small as to be almost unreadable on conventional instruments, even on the instruments of the most sensitive nature. Yet, such deviations were large enough to make some of the tested carburetors unacceptable as failing to function as required by the prescribed standards.

Attempts have also been made to use such laboratory methods to test carburetors on production line. By first determining by precise laboratory methods the fuel consumption per unit of time at various points of the operation of a carburetor known to perform satisfactorily, a numerical value of fuel consumption for such carburetor at various points of its operation range would be first established. Thereupon, measuring the fuel consumption of tested production carburetors and comparing such fuel consumption of each production carburetor of exactly the same functional construction and dimensional specifications with the established standard performance of the tested carburetor would then be evaluated.

However, it was found that the differences in the fuel consumption which could be ascertained by such method were so small that unless the test continued for a relatively long period of time, such differences did not provide a reliable basis for comparison, and no reliable conclusion could be arrived at as a result of such test, particularly with the carburetors operating near the terminal points of the permissible range of performance variations.

In consequence thereof, it was not possible to determine reliably whether test carburetors performed within the prescribed range or outside thereof, and carburetors which should have been accepted would be rejected, while improperly operating carburetors would be accepted, assembled to vehicle engines, and were released for operating on the road for years, contributing heavily to pollution of the atmosphere.

One of the objects of the present invention is to provide an improved method and apparatus for testing carburetors whereby the above difficulties and disadvantages are overcome and largely eliminated, and a carburetor testing apparatus adapted to function as a part of a production line is produced.

Another object of the invention is to provide an improved carburetor testing apparatus which gives a sensible signal indicating directly the mixture ratio produced by the test carburetor and its deviation from the prescribed standard, with such signal being readable directly on an instrument such as a pressure gauge, voltmeter, and the like.

A further object of the invention is to provide a carburetor testing apparatus, such as indicated in the preceding paragraph, in which the mixture ratio indicating instrument has the terminal points of the permissible deviation range marked thereon, with the ratio-indicating hand determining acceptable carburetors by positioning itself within said range, and moving outside thereof for carburetors to be rejected.

A still further object of the present invention is to provide a carburetor testing apparatus with the aid of which a carburetor connected thereto can be tested for a single point of the carburetor operation range or any practicable plurality of such points without removal of the carburetor from the test stand, and completing the entire test within an exceedingly short time, such as less than one minute.

A further object of the present invention is to provide an improved test apparatus system capable of testing a carburetor and giving a direct reading of the air-fuel ratio inherent to that carburetor at several predetermined points of the working or operation range thereof.

A still further object of the present invention is to provide an improved test apparatus system for testing carburetors, producing a signal which is a direct indication of the mixture ratio inherent to that carburetor at a certain air flow therethrough and manifold vacuum, which signal is so amplified as to give a visually distinguishable clear reading seen simultaneously with the test.

A still further object of the present invention is to provide an improved test apparatus system for testing carburetors which makes production testing of every carburetor on a production line practicable, and with the aid of which percentage deviation from the required performance of the tested carburetor from the prescribed standard can be seen simultaneously with the test and continuously as long as the test continues.

A still further object of the present invention is to provide an improved apparatus for testing carburetors and particularly for determining air-fuel ratios of the combustible mixture produced by the tested carburetor at a plurality of points of its operation range and position of the carburetor throttle, at which positions a predetermined rate of air flow and fuel flow through the carburetor at each of said points is determined or controlled by the improved critical flow venturi meter and manifold vacuum, i.e. absolute pressure in the manifold, means being provided to set the throttle of the tested carburetor automatically at the position at which such predetermined absolute pressure in the manifold occurs with the predetermined air flow through the improved critical flow venturi meter, thus ensuring that the same fuel flow occurs through the test carburetor as would occur in an operating engine with the tested carburetor connected thereto and with the same air flow and manifold vacuum occurring therein.

A still further object of the present invention is to provide a throttle-setting device of the nature specified in the preceding paragraph, means being provided whereby the throttle is set automatically in a position at which the predetermined manifold vacuum with the predetermined air flow determined by the improved critical flow venturi meter is reached.

A still further object of the present invention is to produce an indicating device which can be connected to an internal combustion engine or any other instrumentality consuming or receiving a mixture of two fluids, gaseous, liquid, or both, with the ratio of such fluids being of importance, with such indicating system determining and continuously and directly indicating the ratio of the mixture received by such instrumentality.

A still further object of the present invention is to provide a mixture ratio indicating device for a gasoline engine, which device is adapted to measure separately the rate of the air flow and the rate of the fuel flow in such engine and to determine and to indicate directly and continuously the mixture ratio being produced by the carburetor and delivered to such engine for its operation.

A still further object of the present invention is to provide an apparatus for testing carburetors including a chamber corresponding to a certain degree to engine manifold and having installed therein one or more improved critical flow venturi meters determining the maximum air flow, said chamber being so constructed as to receive the air from the carburetor under conditions of minimum of turbulences and in such a manner that the air flow therein does not destroy the relationship of the manifold pressure at which the critical venturi flowmeter was calibrated.

A still further object of the present invention is to provide a carburetor testing apparatus as specified in the preceding paragraph with the chamber thereof including means adapted to separate a large portion of the fuel which passed to the carburetor and to prevent the fuel from increasing the density of the air that has to pass to the critical flow venturi meters and thus preventing change in the operation of the venturi meter by preventing changing the density of the air, and in addition operates to attain substantial economy and increases safety of the operation by reducing the amount of combustible mixture discharged into the atmosphere.

It is still another object of the present invention to provide an improved method of testing carburetors which may be practiced with the aid of an apparatus simple in construction, dependable in operation, which can be operated by a production worker, and does not require for its operation service of a skilled laboratory technician, and which is relatively inexpensive to manufacture and to service.

Further objects and advantages of this invention will be apparent from the following description and appended claims, reference being had to the accompanying drawings forming a part of this specification, wherein like reference characters designate corresponding parts in the several views.

FIG. 1 is an elevational showing one actual installation, including three separate carburetor testing stations assembled into a single unit to be operated by a single operator in a manner to utilize his time in a more efficient manner.

FIG. 2 is a view on a larger scale of the middle portion of one test station, particularly that disposed at the left-hand side of the installation of FIG. 1, and showing in phantom lines and on a larger scale the test carburetor in its operative position in said station.

FIG. 3 is a plan view showing the carburetor mounting fixture adapted to receive the test carburetor and to hold it in place during the test.

Figure 4:
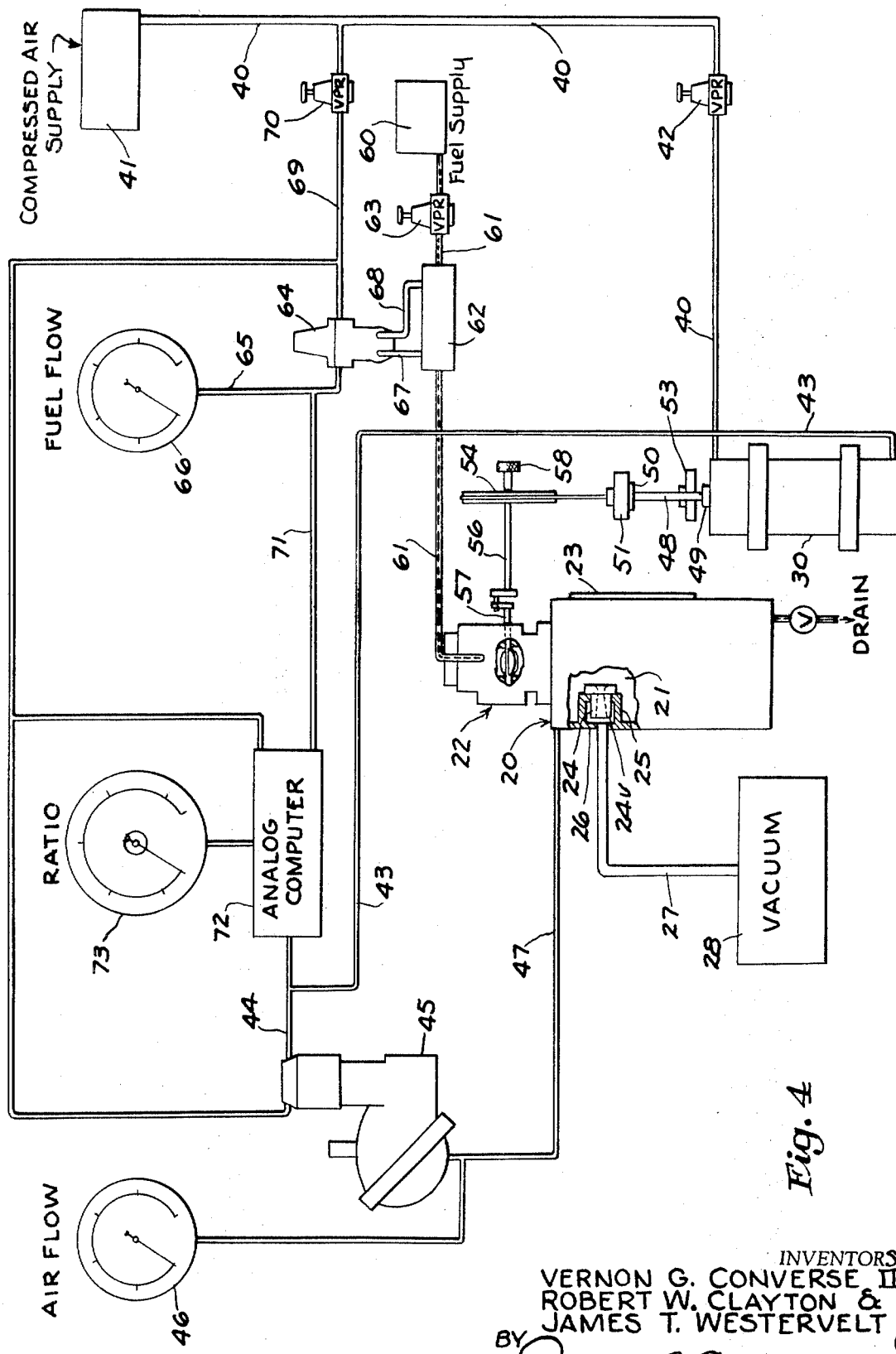

FIG. 4 is a diagrammatic view illustrating the basic concept of the present invention by showing one carburetor testing device or station of pneumatic character and adapted to test a carburetor of a certain definite model and of the same dimensional specifications and at a single point of its operation range and to give indication of the rate of air flows as well as of the rate of fuel flow, and to determine and to give a direct and continuous indication of the mixture ratio, particularly of the air-fuel ratio.

FIG. 5 is a view showing, partly in section, the mechanism adapted to set automatically the throttle of the tested carburetor at a predetermined test position such as idling position, off-idling position, partially open throttle, and fully open throttle, to produce predetermined manifold vacuum for each of such throttle positions.

FIG. 6 is a fragmentary sectional view illustrating the construction of one critical flow venturi meter, one or more of which can be used in a carburetor testing device.

FIG. 7 is an end view of the critical flow venturi meter shown in FIG. 6, with the observer presumed looking at the delivery end thereof.

Figure 8:
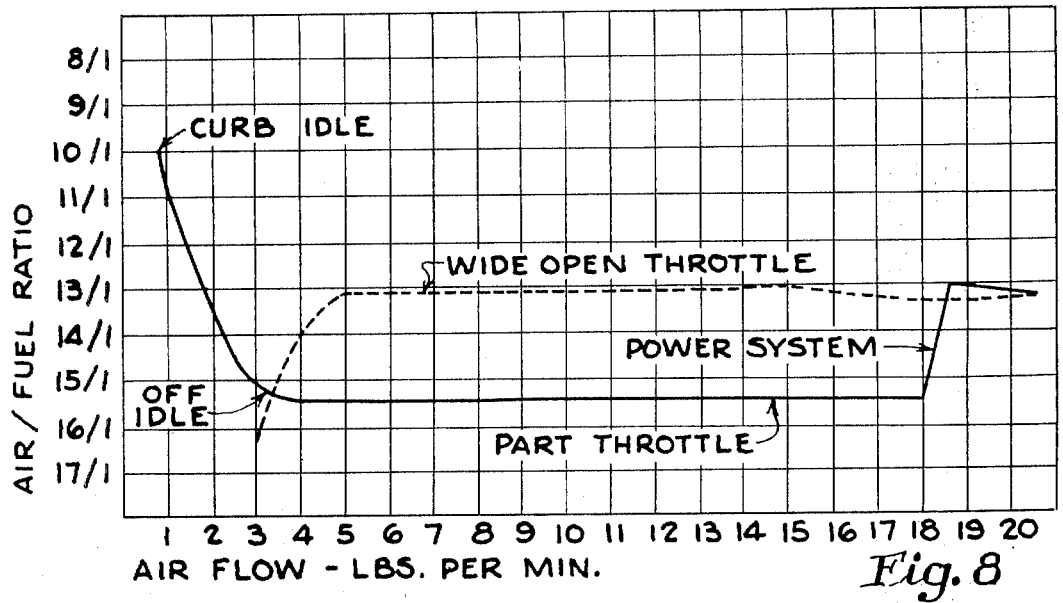

FIG. 8 is a diagram showing air-to-fuel ratio of one typical carburetor, with the air-to-fuel ratio being plotted against the rate of air flow expressed in pounds per minute.

Figure 9:
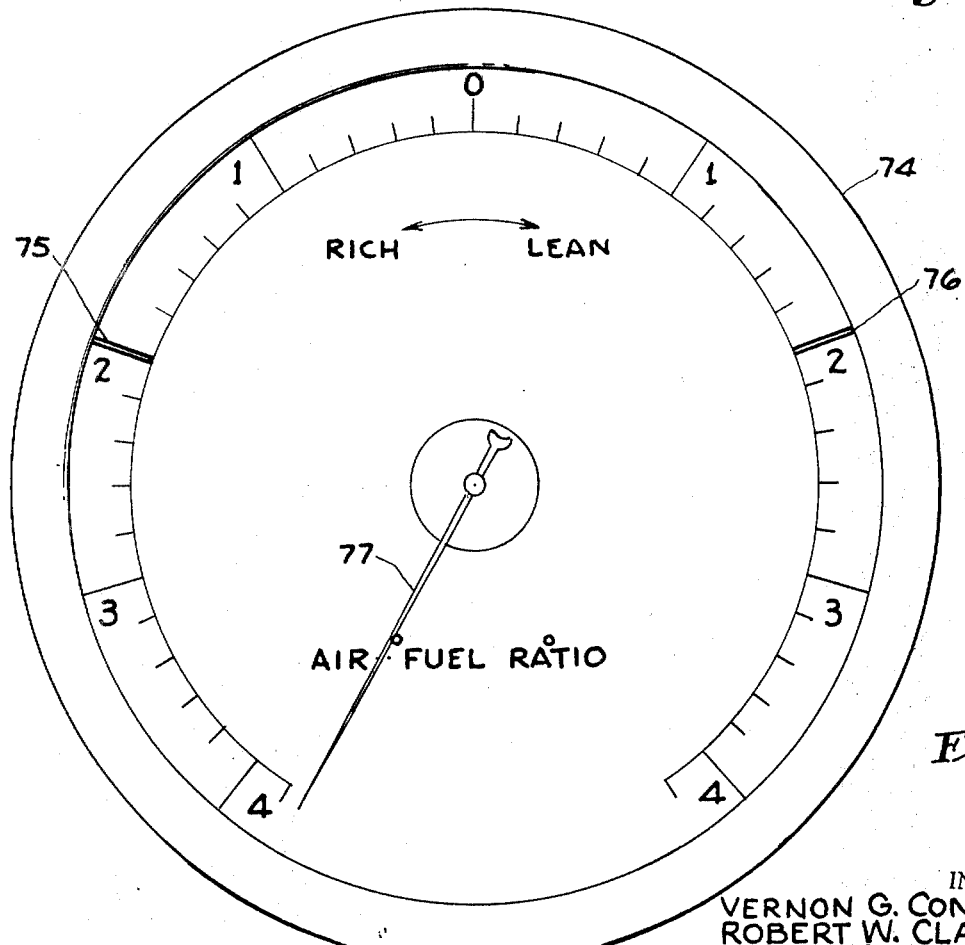

FIG. 9 is a front view of the dial of an air-fuel ratio indicator used in the single-point carburetor testing system of FIG. 4.

Figure 10:
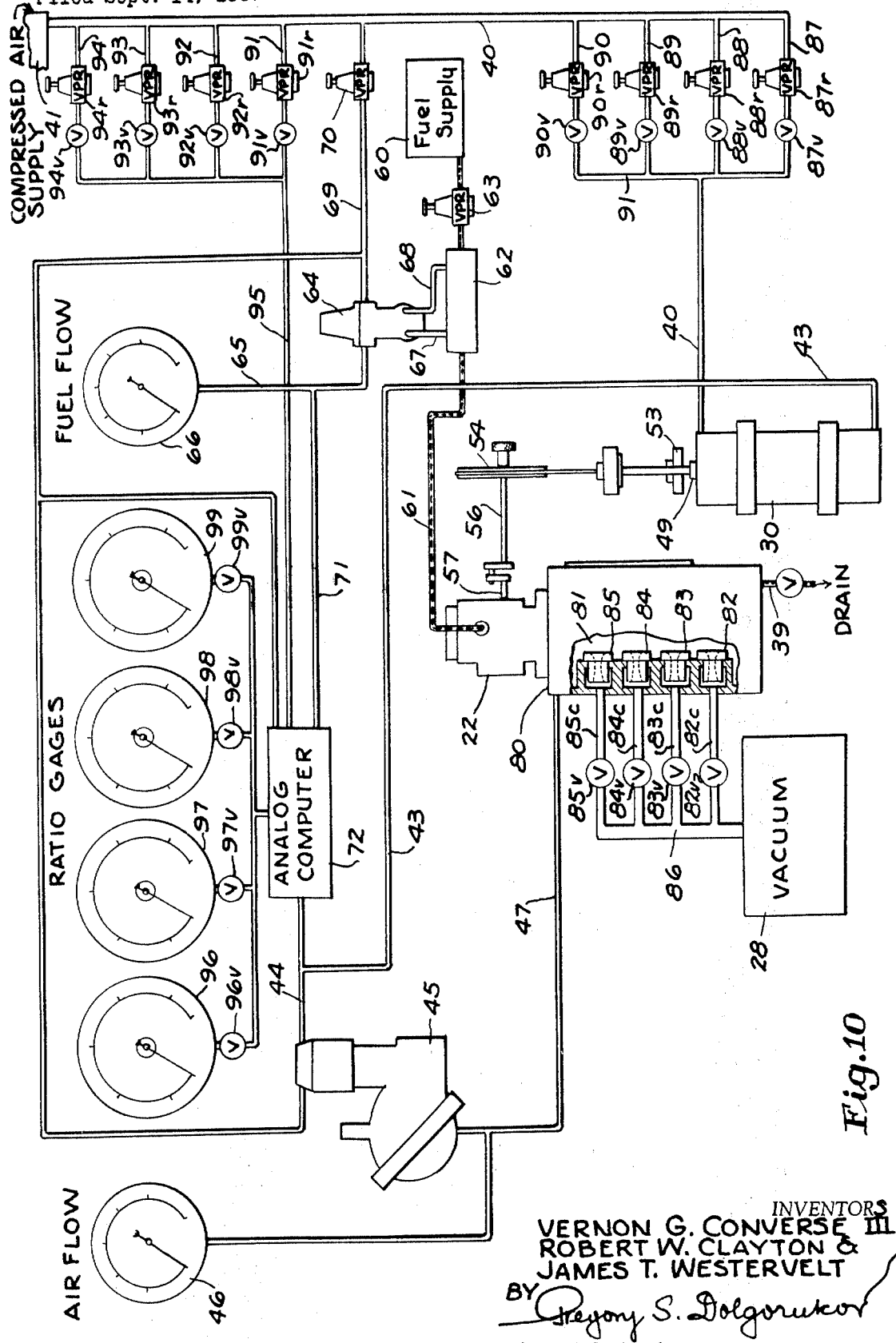

FIG. 10 illustrates in a diagrammatic manner a multiple-point carburetor testing device or station adapted to test a carburetor at four (4) points of its operation range and including four (4) critical flow venturi meters and four (4) gauges indicating mixture ratio at each of such four (4) points, respectively.

Figure 11:
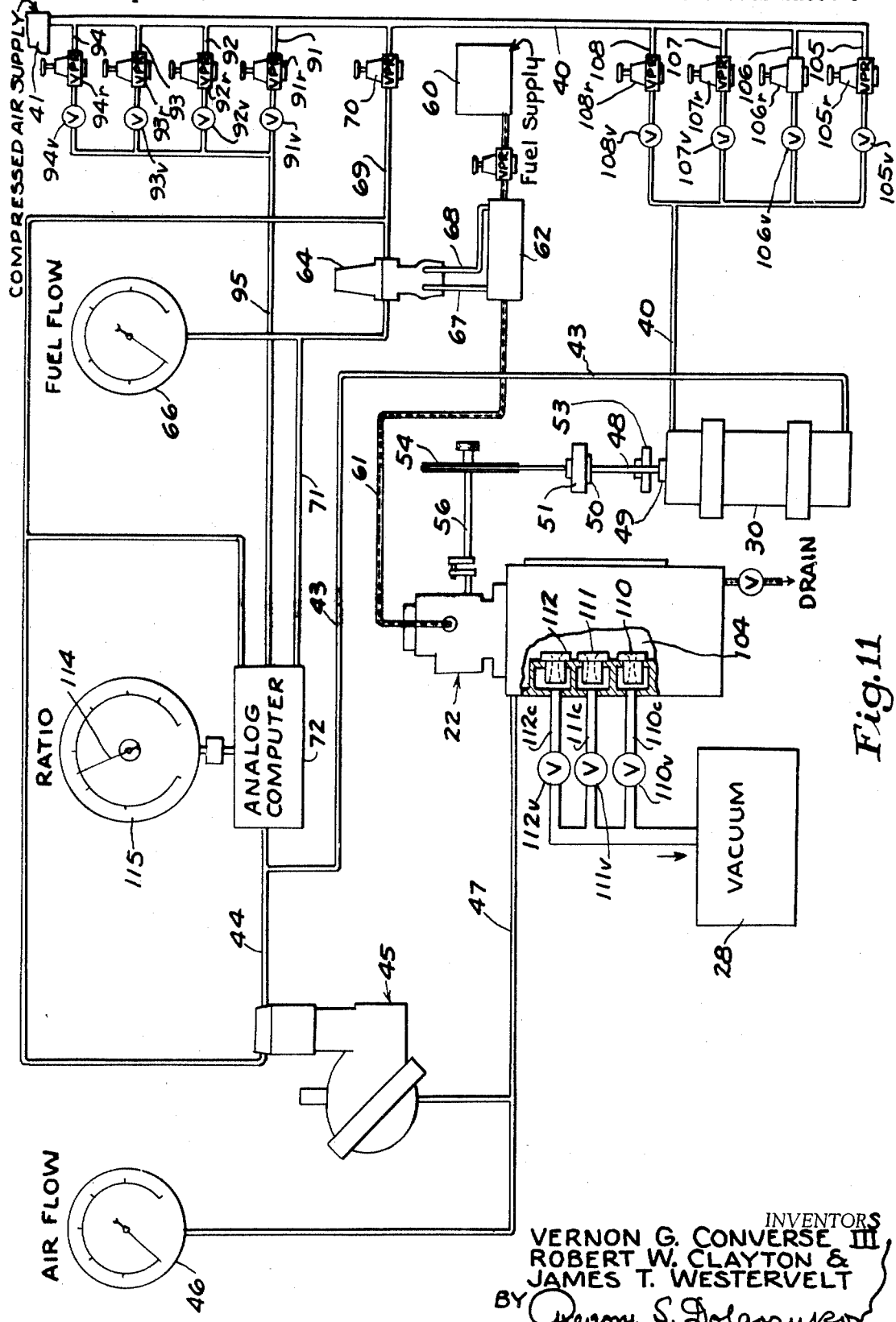

FIG. 11 illustrates in a diagrammatic manner a system functionally similar to that of FIG. 10 but performing such function with the aid of a construction simplified in some of its important particulars and providing for testing a carburetor at four (4) points of its operation range with the aid of only three (3) critical flow venturi meters and a single mixture ratio indicator.

Figure 12:
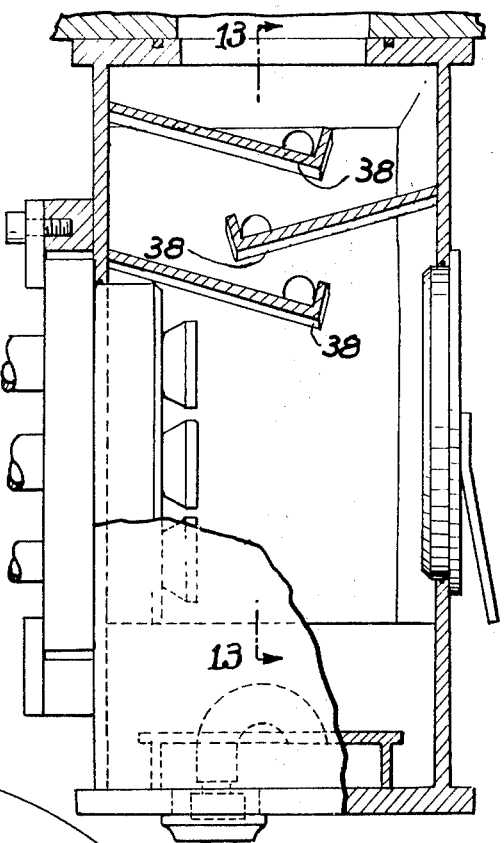

FIG. 12 is a sectional view illustrating on a larger scale the construction of the chamber of the station or system of FIG. 11, in which the critical flow venturi meters are installed.

Figure 13:
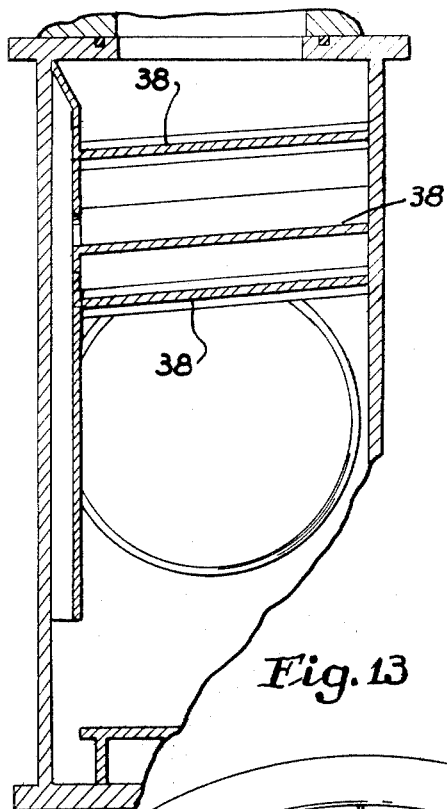

FIG. 13 is a sectional view taken in the direction of the arrows on the section plane passing through the line 13—13 of FIG. 12.

Figure 14:
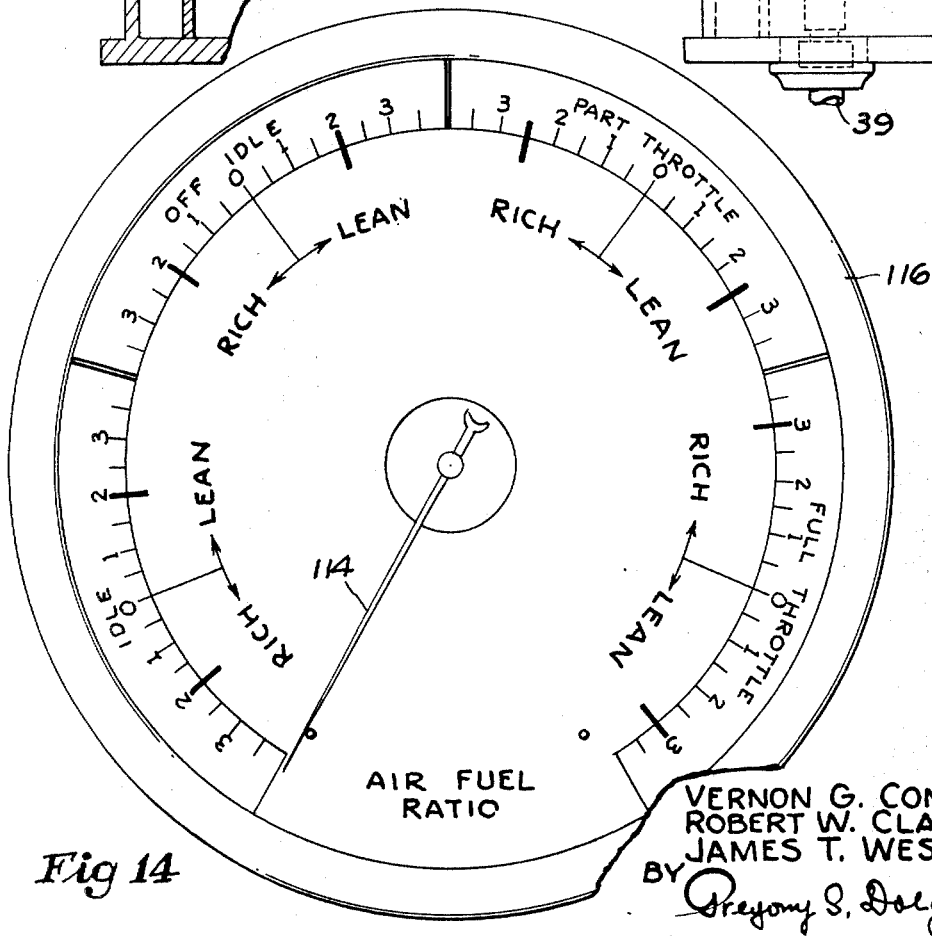

FIG. 14 is a front view of the dial of the mixture ratio indicator of FIG. 11, adapted to indicate selectively on the single dial the mixture ratio occurring successively in all four (4) points of the operation range of the carburetor.

Figure 15:
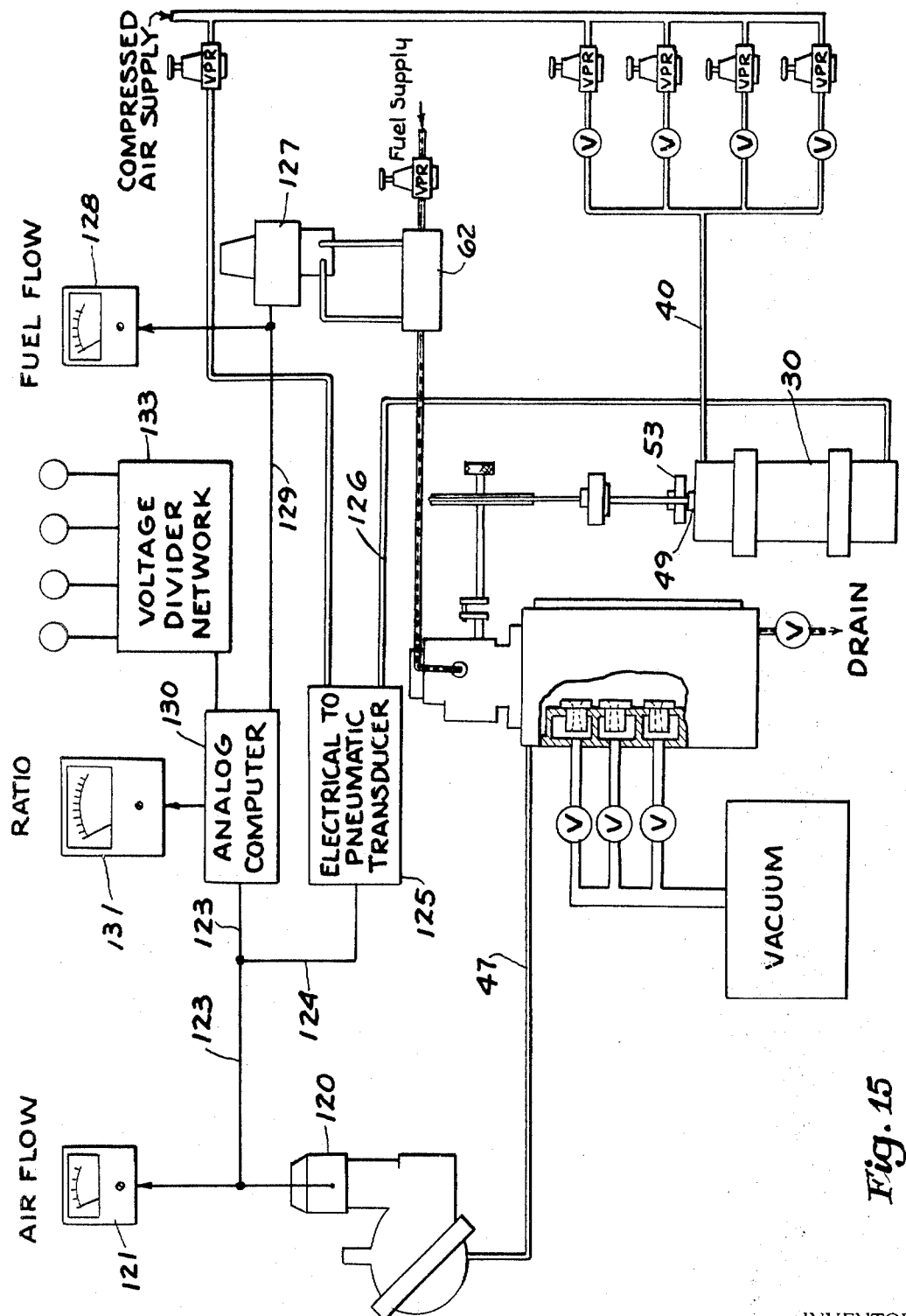

FIG. 15 is a view similar in part to FIG. 11 but in which the sensible signals produced by the air flow measuring device and the fuel flow measuring device, as well as the signal produced by the mixture ratio determining device, are of the electric character.

Figure 16:
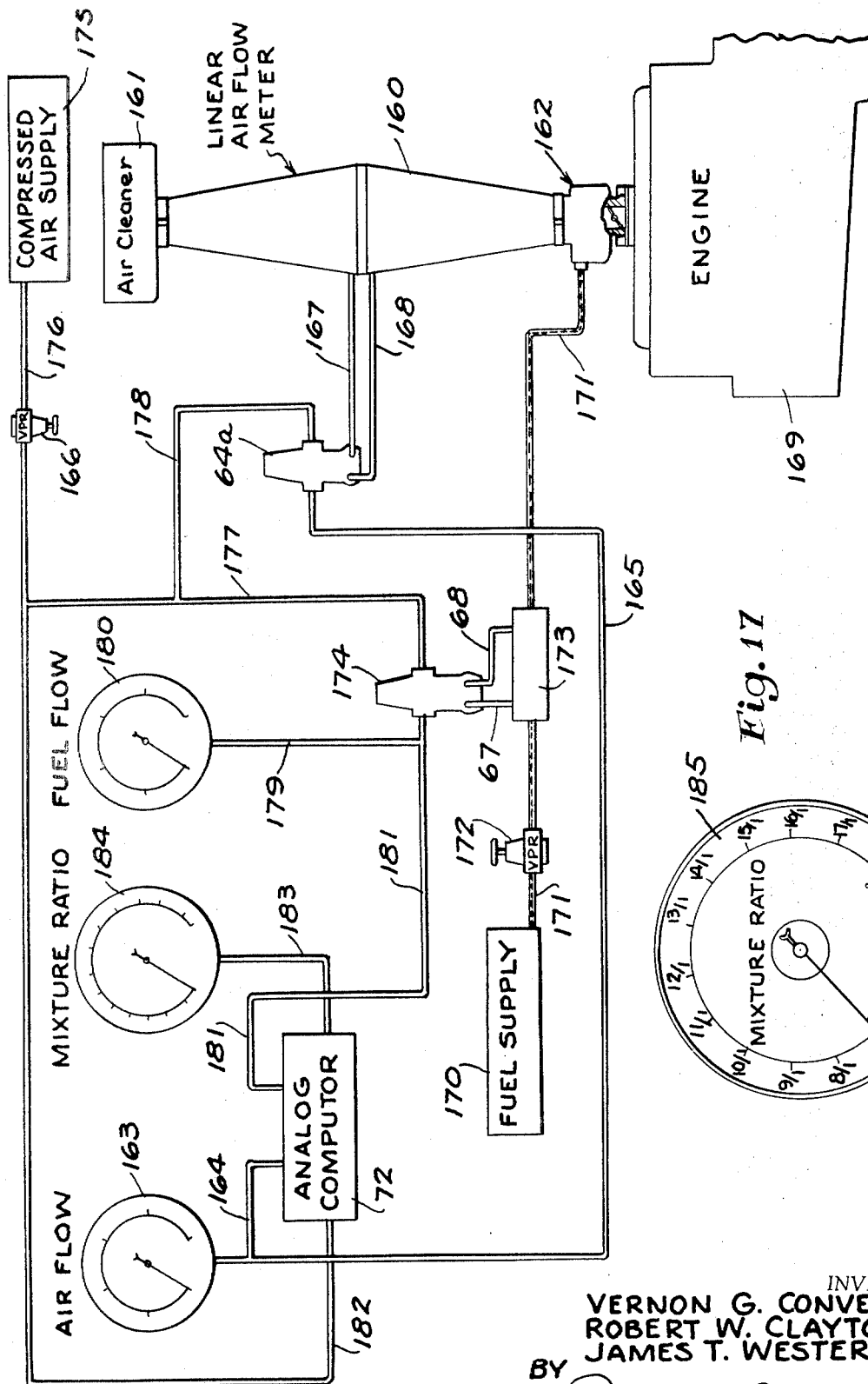

FIG. 16 is a diagrammatic view illustrating the apparatus for determining and continuously indicating simultaneously with the operation of the engine the mixture ratio supplied by the carburetor to the operating engine to which such carburetor is attached.

Figure 17:
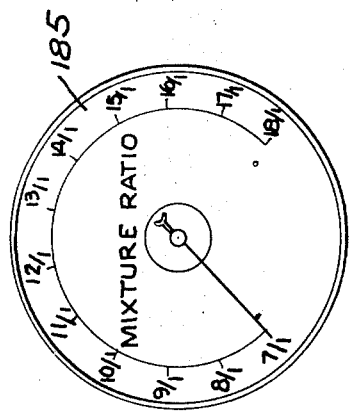

FIG. 17 is an elevational view of the dial of the mixture ratio indicator of the apparatus of FIG. 16.

It is to be understood that the invention is not limited in its application to the details of construction and arrangement of parts illustrated in the accompanying drawings, since the invention is capable of other embodiments and of being practiced or carried out in various ways within the scope of the claims. Also, it is to be understood that the phraseology and terminology employed herein is for the purpose of description and not of limitation.

It will be understood that pressure conditions in the engine manifold, or in the chamber of the carburetor testing device disclosed herein, wherein the pressure does not increase above atmospheric pressure but is generally below it in various degrees, may be expressed in terms of vacuum or in the terms of absolute pressure. Expressing such conditions in terms of vacuum inherently indicates the fact that such pressure is always below atmospheric. On the other hand, while expressing such conditions in terms of absolute pressure offers a more precise and logical measuring and computation possibility, it does not by itself give such indication except by its value. However, both of these terms are used herein.

Mixture ratio of the combustible mixture of a carburetor is the ratio of air to fuel or fuel to air in the combustible mixture produced by the carburetor. It may be expressed in various units and in various ways, such as pounds of air per pound of fuel, and written as a ratio or as a fraction. In both cases, it will be termed air-fuel ratio. It may also be expressed as pound of fuel per pound of air and written as a ratio, as a fraction, or as a decimal. In all such three cases, it will be termed fuel-air ratio. It will also be understood that the same mixture ratio written in the same manner such as air-fuel ratio will have the same numerical expression if metric units such as kilograms of air per kilogram of fuel are used.

In the present disclosure, pounds are used as units of weight and the mixture ratio is expressed as air-fuel ratio, i.e. as the ratio of pounds of air to pounds of fuel. The rate of flow of both air and fuel through the carburetor and other parts of the system is expressed as pounds of air or fuel per minute.

The necessity of testing a carburetor for the general evaluation of its performance results from the fact that requirements of a gasoline engine with respect to mixture ratio for the best operation of the engine are not the same with respect to various points or portions of its operation range. Such requirements vary, depending on the condition of engine operation, and generally require a richer mixture ratio at idling speed of the engine but call for leaner mixtures for off-idle slow speeds of the engine and a part-open throttle when it is generally desired that the engine operate at a greater economy, and where the danger of stalling of the engine is considerably less than at idling speeds. At higher speeds of the engine and particularly at higher power outputs thereof when the air flow is relatively high and the manifold vacuum is relatively low, it is desired to have the mixture enriched, i.e. to have a lower air-fuel ratio in order to increase the power output of the engine. It follows, therefore, that the line showing required air-fuel ratio for ideal operation of the engine if plotted against the air flow would not be a straight line but an irregular line. Accordingly, carburetors are designed to deliver combustible mixture to the engine to satisfy such requirements. However, actual carburetors do not satisfy such requirements fully but only approximate them in varying degrees, depending on the construction of the carburetor, and on workmanship and manufacturing variations.

The closer is such approximation, the better is the construction and workmanship of the carburetor. The further is the deviation of the actual mixture ratio from the ideal ratio, the less acceptable are the construction and the workmanship of the carburetor.

For the purposes of evaluating operation of a carburetor, and particularly to determine the mixture ratio produced thereby, it is necessary to determine the mixture ratio that would be produced by the carburetor at certain representative points of its operation range at substantially the same conditions as those that would occur at such points if the test carburetor were connected to an operative engine.

A performance curve of a carburetor is an irregular line somewhat approximating the ideal line of carburetor requirements but having various deviations and irregularities therein caused by operation of various systems of the carburetor intended to provide the corrected fuel mixture for each condition of operation or by undesirable features of construction and/or manufacturing variations therein.

FIG. 8 shows the curve representing air-fuel ratio of one typical carburetor plotted against air flow expressed in pounds per minute from idle operation conditions through the complete range of carburetor operation, i.e. to and including wide-open throttle at full load of the engine. As can be seen from an examination of said curve, the air-fuel ratio is relatively low and the mixture is relatively rich at idling speeds of the engine. Also, as the air flow increases, the air-fuel ratio becomes considerably higher, giving leaner mixtures for part-open throttle than at wide-open throttle. At part-open throttle, there is an abrupt jump in the curve when the "power system" or "mixture enriching system" of the carburetor comes into play at higher values of air flow when manifold vacuum is lower, resulting in lower air-fuel ratios.

In accordance with the invention, the improved apparatus for testing carburetors, disclosed herein, comprises generally two main systems. The first system may be termed "operation conditions reproducing system" and the second system—"measuring and mixture ratio determining and indicating system." The first system comprises means adapted to receive the carburetor to be tested and to hold it in the test position. This system also includes means to reproduce within the carburetor, as closely as attainable, operation conditions which would exist within that particular carburetor, particularly with respect to the air flow and the fuel flow at a particular point of carburetor operation.

It has been found that while the air flow occurring at a certain point of the operation range of the carburetor is determined by the operation of the engine, the flow of fuel which determines the mixture ratio is determined by the flow of air through the carburetor and by the manifold vacuum in the engine. The manifold vacuum is, in turn, affected by position of the carburetor throttle. It should also be appreciated that the carburetor throttle brings into operation, by it influencing the manifold vacuum as well as by its mechanical position, various systems of the carburetor such as operation of the idling orifices. Therefore, in order to receive reliable test results it is necessary to test a carburetor at a definite point of its operation range by reproducing therein a definite air flow and a definite manifold vacuum occurring at such air flow, and in the case of production testing to compare the performance of test carburetors to prescribed standards.

Accordingly, the test at a certain point of operation range of the carburetor should start first by producing therein the predetermined air flow and thereupon to move the throttle into the position at which the predetermined manifold vacuum occurs. Although manifold vacuum at a certain air flow results from the angular position of the throttle, placing the throttle into a certain angular position in each of the tested carburetors would not produce the same manifold vacuum in all of the tested carburetors because of manufacturing variations therein. Therefore, the angular position of the throttle, even at a predetermined air flow, would not produce a proper test setting, nor would it help to reproduce the operation conditions with sufficient accuracy. In other words, in order to produce proper test conditions, both the air flow and the manifold vacuum or absolute pressure have to be brought in a test carburetor to desired or predetermined values.

The system attains such object by inducing in the carburetor the air flow known to occur in the carburetor of that particular design and dimensional specification at particular points of its operation range, and at the same time bringing the carburetor throttle into the position to produce on the downstream of a carburetor throttle such vacuum or absolute pressure as is known to occur in that particular carburetor at that particular air flow. Below is given a typical chart showing the information which may be given by the carburetor manufacturer with the request for producing a test system or setting an existing system for testing a particular carburetor:

| | Manufacturer's specifications | | | | Values computed for orientation | |
|---|---|---|---|---|---|---|
| Point of operation range of carburetor | Air flow, lbs./min. | Manifold pressure, in. of Hg | Required air-fuel ratio | Permissible deviation in air-fuel ratio in percent | Fuel consumption lbs./min. | Permissible deviation in fuel flow, lbs./min. |
| Idle | 2.00 | 18.5 | 11.1 | ±2 | .18 | ±.0036 |
| Off-idle | 4.00 | 16.5 | 14.1 | ±2 | .28 | ±.0056 |
| Part-open throttle | 8.00 | 12.5 | 15.6.1 | ±2.5 | .52 | ±.0104 |
| Wide-open throttle | 15.00 | 3.0 | 13.1 | ±3 | 1.15 | ±.03 |

In accordance with the invention, the system or apparatus for testing such carburetors may be either of a single-point construction or of a multiple-point construction, in order to create or to reproduce such given conditions corresponding, respectively, to one point of carburetor operation range or to several points thereof and to conduct the tests accordingly.

One-point system may be used for special purposes, such as when operation of a carburetor is of interest with respect to one point only, such as idling, or off-idle, etc.; and no other test of the same carburetor are needed. On the other hand, where performance of a carburetor at other points of its operation range is to be determined also, a multiple-point system is to be used. A multiple-point system may be used as a single-point system. The multiple-point system is required to produce given conditions at a plurality of points of operation range of the carburetor and includes means whereby the tested carburetor can be switched into various circuits, pneumatic, hydraulic, or electric, to have reproduced therein selectively and successively, the operation conditions given for testing the carburetor at a plurality of points. It is of importance for the purposes of production testing that this is done by simple switching of controls and without moving the carburetor from its single test position. In the present embodiment, a four-point system specifically disclosed herein is made to reproduce conditions at four (4) points: idling, off-idling, part-open throttle, and full-open throttle.

The measuring and mixture ratio determining and indicating system, comprises means to measure the rate of air flow and to produce a sensible signal which may be pneumatic, hydraulic, or electric, and be related to or be representative of such flow, and to indicate such signal on a corresponding device, such as a pressure gauge, or voltmeter. Similarly there are provided means to measure the rate of fluid flow in order to produce a sensible signal of the same nature, and to indicate the same in a similar manner. In accordance with the present invention, the sensible signals so produced are impressed on a device which is capable of dividing the value of one signal by the value of the other signal, and thus produce a ratio in the form of a resultant sensible signal which, again, may be pneumatic, hydraulic, or electric, and therefore be indicateable on a suitable measuring device such as a pressure gauge, or voltmeter. The operation of such system is continuous and therefore the signals change with changes of the corresponding values.

The indicating device giving the final signal representing the mixture ratio is graduated in desired units related to the mixture ratio, which may be in the form of air-fuel ratio or fuel-air ratio, as desired. In systems intended to show such ratios and a degree of deviation thereof from the prescribed standards or requirements, the desired mixture ratio for that particular point is shown on the dial of its indicating device as a reference and may be marked as zero. Such zero mark may appear at the uppermost position on the indicating device, with the maximum permissible deviation at both sides of such zero point being correspondingly indicated.

It will be understood that the "operation condition reproducing system" and the "measuring and ratio determining system," while illustrated and described herein as working in combination, may be used separately and for different purposes. The "measuring and mixture ratio determining and indicating system" is particularly useful in such separate application and may be used in combination with a carburetor connected to an operating engine. Being used in a combination with a device responsive to a signal related to the mixture ratio, such a system may be used for the purpose of controlling such mixture ratio automatically, preferably by controlling the air flow, for various operation conditions of the engine.

As mentioned above, for the purposes of testing one carburetor, or a number of carburetors of the same make and model as may be the case in production testing, the manufacturer of the carburetor would supply the laboratory measured values for the air flow at the manifold vacuum at the points at which tests are desired such as at idling, off-idling, part throttle, and wide-open throttle conditions of the carburetor. The carburetor testing apparatus embodying the present invention is then adjusted to produce such conditions of the air flow, and its control means are set to have the system change from one condition of operation to another by merely operating certain controls. When different type of carburetor is to be tested, new values for the air flow and vacuum manifold for that particular carburetor at the points to be tested have to be provided, and the system has to be adjusted to create such conditions at the given points. Adjustment of the system may be done by substitution of the controlling parts, as in the case of critical flow venturi meters, or by resetting the devices such as pressure regulators, or voltage potentiometers.

In accordance with the present invention, the uniformity of the air flow at a predetermined rate is ensured in the tested carburetors by the use in the testing apparatus of a calibrated critical or maximum flow venturi meter, and the fuel flow—by setting the throttle in a position in which in that particular carburetor predetermined vacuum occurs on the downstream of the throttle, i.e. as in manifold, at that particular air flow. In accordance with the invention, such position of the throttle for each tested carburetor is found automatically by operation of pressure-responsive means moving the throttle until the predetermined manifold vacuum occurs and arresting the throttle in that position for the purposes of the test by having such pressure-responsive means to come to a balanced position.

The critical flow venturi meters and their operation as gas flow measuring devices has been now well established in the art, and a detailed description of the theory of such operation and factors determining engineering computations for proper design and production of such critical flow venturi meters for various practical applications was published by the "Journal of Basic Engineering" in an article by B. T. Arnberg entitled, "Review of Critical Flow Meters for Gas Flow Measurements," December 1962, p. 447. For this reason, explaining the factors determining designs of such venturi meters are not deemed necessary herein for the purposes of understanding the present invention.

In the drawings, there is shown, by way of example and in a plurality of embodiments, an improved carburetor testing apparatus embodying the present invention and operating in the manner described above.

FIGS. 1–3 illustrate a commercial embodiment of the invention comprising three (3) separate units or stations assembled in one installation for efficiency of operation. The separate units utilized in this installation include also further improvements such as use of a single indicating gauge for a plurality of points of carburetor operation range at which tests are conducted, as well as provisions for combined use of two (2) or more of critical flow venturi meters. Such further improvements make ready understanding of the basic concept of the present invention more difficult. Accordingly, for clarity of disclosure a simplified embodiment of the present invention illustrated in the drawings are described first in order that the basic constructions on which further improvements are made are first thoroughly understood, whereupon the purpose and the advantages of the further improvements would become more apparent. Accordingly, the construction illustrated in the diagrammatic manner in FIG. 4 will be first described.

The unit illustrated in FIG. 4 is a one-point testing system and is adapted to test carburetors of a single model and dimensional specification for one predetermined calibrated point of operation only. For the purposes of more specific illustration and description, it is presumed that said unit is adapted to test a carburetor of a certain make, model and dimensional specification at off-idle operation condition thereof.

Referring specifically to FIG. 4 of the drawings, the carburetor testing unit embodying the present invention comprises, generally, an "operation conditions reproducing system," and a "mixture ratio determining and indicating system," as mentioned. The "operation conditions reproducing system" comprises a hollow stand generally designated by the numeral 20 including an inner chamber 21 communicating with the inner passage of the test carburetor 22 adapted to be received at the top of the stand 20 and held securely in place thereat in the process of the test. The carburetor locating and holding means provided at the top of the stand 20 will be described in detail further below in connection with the constructions of FIGS. 1–3.

A sealing gate or cover 23 is provided for the purpose of giving access to the chamber 21 and to the critical flow venturi meter 24 received in a nest 25 provided on the wall 26 of the stand 20.

The nest 25 is bored to receive therein the cylindrical body of the venturi meter 24, which body has provided thereon sealing rings 29 adapted to seal the body of the venturi meter in said bore. A flange 24f provided on the received end of the venturi meter 24 forms a shoulder locating the venturi meter 24 in the bore in the axial direction and transmitting the longitudinal force developed in operation to the wall of the nest 25. The peripheral edges of the venturi meter are knurled for convenience of handling. Insertion and removal of the venturi meter into and out of its operative position is done by hand and without the necessity of using any tools or separating any connectors such as screws or bolts. This feature is of importance since such operation is necessary for readjusting the system for testing carburetors at various points of their operation range. No means in addition to the flange 24f are necessary to hold the venturi meter in its operative position since the pneumatic pressure holds the venturi meter in place during the test. A sealing gasket may also be provided at the flange 24f as additional sealing means, if desired.

As shown in the chart given above, this carburetor should have under operation conditions of off-idle throttle the air flow of 4 lbs./min. and manifold pressure of 16.5" of Hg. The required or optimum air-fuel ratio of the combustible mixture produced by such carburetor should be 14:1. On the basis of various functional requirements and government specifications, it is determined, and is so indicated in the above chart, that the test carburetors may have permissible deviation of air-fuel ratio under such conditions not more than 2% in either direction, i.e. 2% leaner mixture or 2% richer mixture than the prescribed standard.

In view of the above requirements, the venturi passage 24v of critical flow venturi meter 24 is carefully calibrated to have maximum flow therethrough equal to 4 lbs./min., at the pressure difference across the throat of the venturi known to produce such maximum flow but irrespective of further increase in the pressure difference across the throat of the venturi. The venturi passage 24v is connected with the aid of a conduit 27 with a vacuum pump, or any other suitable source 28 of vacuum. The capacity of the vacuum pump 28 is amply sufficient to induce maximum flow of fluid, air and fuel mixture, through the venturi passage 24v and, in fact, has an excess of such capacity. The vacuum produced within the chamber 21 because of the operation of the vacuum pump 28 induces corresponding air flow, in the present condition, 4 lbs./min., through the carburetor, inducing a corresponding fuel flow through the jet of the carburetor due to the venturi action thereat. It is important to appreciate at this point, that such fuel flow in the test apparatus would not be representative of the conditions in an operating gasoline engine since it could be considerably different than the actual flow of fuel through the jet of the carburetor in an operating engine, since that flow would be affected and considerably changed by operation of the manifold vacuum. As indicated in the chart given above, at the specified operation condition of off-idle throttle position the manifold pressure in an operating engine would be 16.5" of Hg. This pressure will be the resultant of the air flow and angular position of the throttle.

Thus, for properly reproducing the operation conditions of a carburetor in a gasoline engine, it is necessary to reproduce not only the corresponding air flow through the carburetor but also to bring the throttle of the carburetor into such position that the above given manifold vacuum is reproduced. We have found that attempts to place the carburetor throttle into a corresponding angular position as it may be in a laboratory tested carburetor would neither give the prescribed manifold vacuum nor would it be sufficient or desirable for many reasons explained in detail below. In accordance with the invention, the prescribed manifold vacuum is produced by operation of pressure-responsive means which bring the carburetor throttle into the proper responsive position.

It should be understood that the means for setting the throttle of the test carburetor in the position at which the predetermined manifold vacuum occurs within the chamber 21 could be in the form of manual means connected to the throttle for actuating the same and setting it in the desired position, with absolute pressure gauge or a vacuum gauge being provided to indicate absolute pressure or vacuum in the chamber 21. With such means, the operator, after having produced the predetermined air flow by setting the vacuum pump 28 in operation, would move the throttle by hand from its open position toward its closed position watching the vacuum gauge. As soon as the vacuum gauge indicates that the predetermined vacuum occurred within the chamber 21, the operator would fix the throttle in that position and proceed further with the tests. Such a construction, while being effective for the purposes intended, is very slow, requires close attention on the part of the operator, is inefficient in production testing, and requires an operator equal in his skill to that of a laboratory technician rather than that of a production worker.

In accordance with the invention, means are provided whereby the carburetor throttle is moved quickly and automatically into the desired position and is set therein by the operation of pressure-responsive means and without requiring actuation of any additional controls or watching any instruments or timely actuating any controls on the basis of vacuum gauge indications.

In accordance with the invention, there is provided a throttle positioner which moves the throttle and arrests it in a proper position automatically. In the present embodiment of the invention, such means comprise a vertically disposed air cylinder generally designated by the numeral 30. Referring now to FIG. 5 wherein said cylinder is illustrated on the larger scale and partly in section, it can be seen that said cylinder has a piston 31 loosely fitted therein. An upper annular diaphragm 32 has its inner edges sealingly connected to the top of the piston 31 as indicated at 33 and its peripheral edges pinched between the flanges of the main section 34 of the cylinder 30 and the flanges of the upper cover 35 thereof. A similar diaphragm 36 is sealingly connected to the lower end of the piston 31 with its peripheral edges pinched between the flanges of the main section 34 of the cylinder 30 and the bottom cover 37 thereof.

By virtue of such construction, the piston 31 sealingly divides the inner space of the cylinder 30 into two parts and, in fact, floats within said cylinder.

Because of its weight, the piston 31 tends to move downward in the cylinder 30 and to remain in its lowermost position. Downward movement of the piston 31 is also aided by pneumatic force created by the pressure within the upper portion of the cylinder 30. Similarly, any force resulting from the pressure within the lower portion of the cylinder 30 tends to lift the piston 31 in the cylinder in opposition to such downwardly acting forces. Because of the operation of such mutually opposing forces, position of the piston 31 within the cylinder 30 is determined by the location in the cylinder at which balance of such forces occur.

The upper portion of the cylinder 30 is connected by a conduit 40 with an air compressor or other suitable source 41 of compressed air, with a pressure reducer or pressure regulator 42 being interposed in said conduit 40 in order to ensure delivery of a predetermined pressure into the upper portion of said cylinder, and to permit adjustments of such pressure. The lower portion of the pressure cylinder 30 is connected with the aid of a conduit 43 with a conduit 44 connected to a metagraphic absolute pressure transmitter 45. This device measures absolute pressure by means of a single evacuated multiple capsule element and converts this process-variable into a pneumatic signal for transmission to a remote pressure indicating device 46, and by means of the conduit 43 to the lower portion of the cylinder 30.

It is by operation of the above-described means that such mutually opposing forces are produced, which forces come to a balance as described because of the responsive movements of the piston 31.

It should be understood that manifold vacuum or vacuum within the chamber 21 is indication of the rate of air flow through the carburetor. The higher is the manifold vacuum, the lower is the air flow. The lower is the manifold vacuum, or the higher is the absolute pressure, the higher is the air flow. With the wide-open throttle, the air flow through the carburetor is at its high value, and the absolute pressure in the manifold approaches atmospheric pressure. The absolute pressure or vacuum within the chamber 21 is transmitted to the absolute pressure transmitter 45 through the conduit 47. Accordingly, by suitably graduating the gage 46, such gage is made an instrument indicating the air flow through the carburetor. The absolute pressure transmitter 45 also operates to convert vacuum into pressure and thus provide air under pressure and transmit it through the conduit 43 to the throttle positioner for operation of the piston 31.

Movements of the piston 31 are transmitted through the piston rod 48 to a disc 50 which is adapted in its upward movements to act on a weight 51 to raise the same.

A bearing 49 constructed to allow leakage of air around the piston rod 48 is provided to cause the layer of air around said rod to act as a lubricant and prevent metal-to-metal contact, thus providing for frictionless movement of the piston rod passing through bearing 49. Adjustment of the pressure regulator 42 is such as to provide or compensate for such leakage of air and ensure uniform operation.

The weight 51 is connected to a flexible connector 52 passed over a pulley 54 and having a smaller weight 53 connected to its other end. The flexible connector 52 is secured to the pulley 54 as indicated at 55 to prevent slippage of the connector on said pulley. With the weight 51 being greater than the weight 53, a force equal to the difference between their respective weights is always acting in the downward direction on the disc 50. In one actual installation, the larger weight is four pounds and the smaller weight is two pounds, whereby a force of two pounds is acting on the disc 50 and through the piston rod 48 on the piston 31, thus adding to the force produced by the weight of said piston 31 and its connected parts, tending to move the piston downwardly.

It will now be seen in view of the foregoing that with no fluid forces acting on the piston 31, the same would move downwardly by gravity and would remain in its lowermost position unless moved upwardly by a greater force. This tendency of the piston 31 is modified by the fluid forces acting on it and resulting from the pressures transmitted to the upper and the lower portions of the cylinder 30 through the conduits 40 and 43, respectively, as mentioned.

The pulley 54 is connected to the carburetor throttle through the shaft 56 which, in turn, is connected to the shaft 57 of the carburetor throttle by separable connection described in detail further below in connection with the description of the construction of FIG. 2. A knurled knob 58 is provided on the other end of the shaft 56 for convenience in manually connecting the shaft 56 to the throttle shaft.

In adjusting originally the pressure for transmission to the upper portion of the cylinder 30, the job setter adjusting the system for testing carburetors at a certain point of its operation range would regulate the pressure reducer 42 measuring and watching the vacuum gauge indicating vacuum within the chamber 21 very much in the same manner as was described above with reference to manual setting of carburetor throttle. However, while in manual setting he has to go through such setting operation for each and every tested carburetor, with the use of the above-described construction he needs to do it only once for the same type of carburetors many thousands of which may have to be tested on a production line. In continuing such setting, the job setter would manipulate the pressure regulator 42 until the vacuum gauge indicates that the predetermined vacuum in the chamber 21 has been reached, and then leaves the pressure reducer 42 in such adjusted position. In consequence thereof, the balanced position for the piston 31 and the proper position for the throttle would thus be reached in the manner explained above.

There are thus produced in a tested carburetor the operation conditions which would occur therein at the predetermined point of its operation range if such carburetor operated in connection with a gasoline engine. Measuring the rate of the fuel flow and the rate of air flow in a tested carburetor, and determining and indicating the mixture ratio produced by the tested carburetor under such conditions is attained with the aid of the "measuring and mixture ratio determining and indicating system" of the improved apparatus and such system is described below.

The flow of air through the carburetor 22 produced in the manner described above induces flow of fuel through the carburetor jet by venturi action, with such fuel being supplied to the carburetor from a source 60 of fuel supply through a conduit 61. It will be understood that such fuel flow determines the performance of the tested carburetor and its value determines the mixture ratio and therefore its determination is an important part of the subject matter of the test. In other words, while the air flow through the carburetor is a controllable value produced in its predetermined magnitude with the aid of the critical flow venturi meters of the "operation conditions reproducing system," the fuel flow is uncontrollable value, determination of which is performed by the "measuring and mixture ratio determining and indicating system."

In order to determine the rate of fuel flow, a mass flowmeter device generally designated by the numeral 62 is provided. The instrument preferred for such use is of the orifice type which develops a linear differential pressure signal directly proportional to the mass flow rate. Flowmeters of such nature are now well known in the art, and several makes of such instruments are available on the market. One such flowmeter is described in the U.S. Pat. No. 3,015,233. While the flow through the flowmeter is hydraulic, the sensible signal produced thereby may be pneumatic, hydraulic, or electric. In the present embodiment, a pneumatic pressure signal is utilized. A pressure regulator 63 is interposed in the conduit 61 in order to produce a liquid head similar to that at which fuel is delivered to the carburetor in an operative engine. Accordingly, adjustment of said pressure regulator 63 is necessary only for the purpose of calibration of the fuel flow.

In order to produce a steadier and more reliable signal, the pneumatic signal produced by the flowmeter 62 is amplified in a predetermined degree with the aid of a pneumatic amplifier 64, which may be of the same construction as the pneumatic amplifier disclosed in the U.S. Pat. No. 3,248,931 to Scans Associates, Inc. on the application of L. J. Berger, Jr. et al. Amplification of the pneumatic signal produced by the flowmeter 62 increases precision of measuring of such signal and convenience of operation. The amplified signal from said pneumatic amplifier 64 is transmitted through a conduit 65 to an indicator 66. The latter device is, in effect, a pressure gauge specially graduated on the basis of relation of the pneumatic signal to the rate of fuel flow. Therefore, the instrument 66 indicates the rate of fuel flow in desired units, corresponding to the units in which the air flow indicating device 46 is graduated. It is preferable to have the indicating devices 46 and 66 graduated in pounds per minute, although any other suitable system of graduation, or units of other nature, such as metric, may be used. It should be appreciated that the indicating devices 46 and 66 are, in effect, pressure indicating instruments. However, since the pressures indicated by these devices are related to the respective rates of air flow and fuel flow, they are graduated in the rate of flow units.

Conduits 67 and 68 transmit to the pneumatic amplifier 64 the signal produced by the fuel flowmeter, which signal operates as the primary pressure in said amplifier 64. This operation is explained in detail in said U.S. Pat. No. 3,248,931. The secondary pressure, which is greater than the primary pressure but is modified in proportion to the changes in the primary pressure, is supplied to the amplifier 64 through a conduit 69, and in its modified values is transmitted to the gauge 66 through the conduit 65. This pressure is transmitted from the compressed air supply source 41 through the conduit 40 and is adjusted, substantially for the only purpose of providing sufficient and steady pressure, by the pressure regulator 70.

The amplified pressure from the pneumatic amplifier 64 is also transmitted through the conduit 71 to the analog computer 72.

It should be appreciated that the mass flowmeter 62 produces a signal related to the rate of the fuel flow rather than the mass or quantity of the fuel passed therethrough during a certain period of time. Therefore, the indications given by the fuel flow indicator 66 are continuous and not periodic. Thus, as the result of the operation of the construction so far described, there are provided continuous separate indications of the rate of the air flow through the test carburetor by the gauge 46, and of the rate of the fuel flow induced in the carburetor by the air flow, with the latter measurements and indications being done by the gauge 66.

In accordance with the invention, there are provided means whereby the mixture ratio produced by the test carburetor is given directly and continuously, as well as simultaneously with the tests.

To attain such an object, the absolute pressure value related to or representative of the actual rate of the air flow through the carburetor and produced by the absolute pressure transmitter 45 is impressed on the analog computer 72 through the conduit 44. Thus, the values related to the rate of the air flow and to the rate of the fuel flow are impressed on the analog computer, as mentioned. The analog computer 72 is of pneumatic type and is a device often referred to as "force bridge." Such devices are used for automatic solution of problems expressed by the equation $A \times C = B \times D$, where A, B, C and D represent forces. Any problem which can be reduced to the above formula can be solved with the aid of such "force bridge." Particularly, values represented by pneumatic forces may be added, subtracted, multiplied, or divided by each other. However, such "force bridge" device must be specially assembled for solution of such separate problems. In order to determine the mixture ratio such as ratio of air to fuel, the value related to the rate of air flow is divided with the aid of such "force bridge" by the value related to or representing the rate of fuel flow. The output of such operation of the "force bridge" is also a pneumatic pressure value, and, therefore, it can be measured by any suitable pressure indicating instrument and, what is particularly important, it is continuous.

The force bridge device does not represent per se a part of the present invention, and therefore a detailed description and illustration of such devices is not deemed necessary herein for the proper understanding of the present invention. It may be mentioned, however, that a device of this nature identified as "Pneumatic Analog Computer," Model B-2, produced by Sortenberg Controls Corp. of Norwalk, Conn., gives satisfactory results.

It will be understood that similarly to the fuel flowmeter 62, the absolute pressure transmitter 45 measures the rate of air flow, rather than the total amount or weight of air passed through the carburetor during the test period, as could be done for laboratory test purposes. Therefore, operation of the indicating device or gauge 46 is continuous rather than periodic, and the operator can see on the dial of this device what is the rate of the air flow through the carburetor at that particular moment.

Since the signal produced by the analog computer 72 and representative or related to the ratio of the mixture produced by the test carburetor 22, it is also a pressure value, it may be measured or continuously indicated by a suitable pressure indicating device or gauge graduated in a manner to relate its pressure indications to the mixture ratio. In the present embodiment, such device is exemplified by a specially graduated gauge 73.

For performance of a test, a test carburetor such as 22 is put in place on the stand 20 and sealingly secured thereto. The fuel line is connected to the carburetor and the vacuum pump 28 is put in operation. With the pressure regulator 42 being set for test at that particular point of carburetor operation, the throttle positioner will operate automatically to set the carburetor throttle in a position to produce the predetermined manifold vacuum within the chamber 21. In the present example, such vacuum is 16.5" of Hg as given in the above chart. The air flow thus produced is indicated on the gauge 46 and induces a corresponding flow of fuel through the test carburetor, the rate of which is indicated on the gauge 66. Simultaneously therewith, the analog computer produces a signal indicative of the mixture ratio, the value of which is indicated on the gauge 73.

The dial of the gauge such as 74 may be graduated in accordance with the requirements of the test. Where the precise mixture ratio is to be determined and read on the dial, such dial is graduated in units of mixture ratio. Referring to FIG. 8, it will be seen that actual ratios expressed in the terms of air-fuel ratios vary from 8:1 ratio, giving the richest mixture capable of being ignited in the engine cylinder, to 17:1 which designates a very lean mixture. Such lean mixture burns so slow that operation of the engine becomes erratic and shooting back through the carburetor occurs. The latter condition is due to the fact that by the time the intake valve opens to admit fresh combustible mixture, the mixture to be exhausted is still burning in the cylinder and ignites the fresh incoming combustible mixture. With such graduation, the smallest ratio may be indicated at the starting point on the left-hand side of the dial, and the highest mixture ratio designating the leanest mixture may be indicated on the right-hand side or final point of the gauge hand movement on the right-hand side of the dial. With such graduation, the medium ratios would be marked in the middle point of the hand path and be at the highest point on the dial. Such graduation would be particularly suitable for experimental and laboratory tests.

For the purposes of production testing, a graduation system provided on the dial shown in FIG. 9 is preferred. It can be appreciated that for the purposes of production tests, it is important to have a quick indication whether or not the carburetor produces the desired mixture ratio and if it does not, whether the deviation of the ratio produced from the desired or prescribed standard is within permissible limits set therefor. In accordance with such requirements and on the basis of the exemplary conditions given in the chart above, the prescribed air-fuel ratio should be 14:1, and deviation therefrom in either direction should not exceed 2%. With such requirement, the dial is graduated in such a manner that the ratio of 14:1 would be marked at the highest point on the dial and designated by the mark zero (0). The deviations from the zero point in percent and portions thereof is marked on both sides of the zero point, as indicated, to the sufficient degree, such as 4%. Since the permissible deviation for the conditions given is 2%, heavy red lines or similar markings are provided at the points indicating deviation of 2% on both sides of the zero mark, as indicated at 75 and 76.

With such marking, the operataor merely watches the hand 77 as it reaches a balanced position on the dial. If the hand 77 sets at zero mark, it indicates that the test carburetor performs in the ideal manner and is obviously acceptable. If the hand 77 sets at any graduation between the marks 75 and 76, it indicates an acceptable carburetor. On the other hand, if the hand 77 sets outside such marks, the test carburetor does not comply with the prescribed standards and is to be rejected. For instance, if the hand 77 sets at the mark indicating 1.5% on the left-hand side of the zero mark, it indicates that the test carburetor gives mixture ratio which is 1.5% richer than prescribed standard but the test carburetor is still acceptable. Should the hand 77 set at mark indicating 1% on the right-hand side of the zero mark, it indicates that the mixture ratio produced by the test carburetor is 1% leaner than prescribed standard but the test carburetor is acceptable.

In order to provide a second indication which confirms the indications of the hand 77, two electric circuits may be provided in connection with the gauge 74 whereby setting of the hand 77 between the marks 75 and 76 switches on a green light, while setting of such hand 77 anywhere beyond said marks, except the initial position, switches on a red light indicating a defective carburetor which must be rejected.

At this point, it should be understood that operation of a critical flow venturi meter may be objectionably affected in a degree distorting the results of the test by the turbulences upstream of the operating venturi meter. The more violent are such turbulences, the greater is the detrimental effect. Therefore, it is important for the precision of testing to have such flow conditions in the chamber as to avoid undue turbulences and resulting differences in the pressure in various parts of the chamber. It should also be appreciated that such result cannot be attained merely by increasing the size of the chamber since with an unduly large chamber it would take too long for the system to come to a balanced condition at low flows such as idle, off-idle and even part-open throttle conditions. Therefore, there is a limit to the size of the chamber for attaining proper operation of the system.

The optimum size of the chamber is determined by the size of the carburetor and the points at which tests are made. A large carburetor may require much large chamber, but that chamber may be too large for a smaller carburetor. Accordingly, it is necessary to find position for each venturi meter in a given chamber at which pressures at various locations within the chamber are as uniform as possible, with the differences in pressure at such various locations not exceeding plus-minus $\frac{1}{10}$ of an inch of Hg. The design of the chamber can best be arrived at experimentally by inducing the critical flow through each nozzle and measuring the pressure throughout the various points of the chamber. If differences in pressure in various locations in the chamber exceed the prescribed limit, it indicates presence of undesirable turbulences, and the venturi meter is moved to another place, and measurements are taken again. The venturi meter is finally set at the place showing best conditions. Then the tests for the next size venturi meter or a combination of such venturi meters is repeated until desired results are achieved.

In order to prevent discharging combustible mixture from the vacuum pump 28 into the atmosphere and thus contribute to air pollution, create danger of having such combustible mixture accidentally ignited upon its discharge, and in order to prevent waste of considerable quantities of fuel, it is desired to reclaim as much of the fuel as possible. This is attained by creating a substantially circular motion of the mixture coming from the carburetor 22 into the chamber 21, creating such motion as close to the carburetor as possible, i.e. before the fuel has a chance to evaporate. Creating such a motion operates to separate the fuel by centrifugal action prior to the mixture going into the venturi meters. In the present embodiment of the invention, the separated fuel is collected by alternating baffles 38, see FIGS. 12 and 13, with said baffles being inclined to drain the fuel into pipes leading to a common collector from which it is discharged through a pipe, such as 39, into a collector of reclaimed fuel for repeat use.

The apparatus illustrated in FIG. 10 is a multiple-point system adapted to test a carburetor at a plurality of points of the operation range of the test carburetor. For the purposes of more specific description, the multiplie-point system is illustrated and described as adapted to test the carburetor at four (4) points of its operation range, particularly idle, off-idle, part-open throttle and wide-open throttle. In the following description, reference will again be made to the chart of column 8, lines 57–67, and numerical values given therein for one typical carburetor may be used.

Referring specifically to FIG. 10, it will be noted that in the stand designated by the numeral 80, there are provided in a manner similar to that described in connection with FIG. 4, four (4) critical flow venturi meters designated by the numerals 82, 83, 84 and 85, respectively. Each of said critical flow venturi meters has its venturi passage carefully calibrated to provide the air flow for the specified conditions. Referring to the above chart, it is presumed for the purposes of more specific description that the venturi meter 82 is calibrated to provide the air flow of 2.00 lbs./min. for idle throttle operation. Each of said venturi meters is connected with the header conduit 86 and therefore with the vacuum pump 28 with the aid of a separate conduit 82c, 83c, 84c, and 85c, respectively, with the control valves 82v, 83v, 84v, and 85v being operatively interposed within said conduits, respectively, in order to provide for interrupting or re-establishing such communications. By manipulating such valves, i.e., opening one of them and closing the rest, any one of the venturi meters 82–85 may be put in operation, with the remaining three venturi meters, being made inactive by closing their corresponding valves. Two or more venturi meters may be used in a combined operation to produce different air flows at some other corresponding manifold vacuum.

Similarly, for operating the throttle positioner there are provided four branch conduits 87, 88, 89, and 90, each provided with a pressure regulator or reducer valve 87r, 88r, 89r, and 90r, respectively, and a valve 87v, 88v, 89v, and 90v, respectively. Each of said conduits 87–90 communicates through a header conduit 91 with the conduit 40 leading to the top of the cylinder 30 of the throttle positioner. Each of the pressure reducers 87r–90r is adjusted to set the throttle in a position to create in the chamber 81 vacuum corresponding to that specified for the particular point of carburetor operation at which the test is to be made and at air flow corresponding thereto.

Referring to the chart given in column 8, lines 57–67, the pressure reducer 87 is set to produce in combined operation with the venturi meter 82, air flow of 2.00 lbs./ min. and manifold vacuum equal to 18.5" of Hg for idle operation; the valve reduced 88r operating in combination with a venturi meter 83 is set to produce air flow of 4.00 lbs./min. and manifold vacuum of 16.5" of Hg for off-idle operation; the pressure reducer 89r operating in combination with venturi meter 84 is set to produce air flow of 8.00 lbs./min. and manifold vacuum of 12.5" of Hg for part-open throttle operation; and valve reducer 90r operating in combination with the venturi meter 85 is set to produce air flow of 15.00 lbs./min. and manifold vacuum of 3.0" of Hg for wide-open throttle operation.

With presetting of the pressure reducers 87r–90r, having one of said valves open with the remaining three closed, the throttle positioner will automatically set the throttle of the test carburetor 22 to produce in the chamber 81 the vacuum specified for that particular point of carburetor operation. With the critical flow venturi meter operating in combination with the opened valve and producing the predetermined air flow, the fuel flow through the carburetor 22 will thus be induced. With the manifold vacuum or absolute pressure in the chamber 81 being transmitted by the conduit 47 to the absolute pressure transmitter 45, a pneumatic signal related to such manifold absolute pressure and, therefore, to the rate of air flow will be indicated on the gauge 46 and transmitted to the analog computer 72 through the conduit 44 and through the conduit 43 to the lower portion of the cylinder 30 of the throttle positioner, in the same manner as was explained with respect to the system of FIG. 4.

The fuel flow induced in the carburetor by the air flow and the manifold vacuum is measured by the mass flowmeter 62. The fuel passing through the mass flowmeter 62 is transmitted to the test carburetor 22 through the conduit 61. The pneumatic signal produced by said flowmeter 62 is amplified by the pneumatic amplifier 64 and is impressed on the analog computer 72 through a conduit 71, and to the gauge 66 through conduit 65 for indication, all in substantially the same manner as in the construction of FIG. 4. Four pressure reducers 91r, 92r, 93r, and 94r, are operatively interposed in the branch conduits 91, 92, 93, and 94, respectively, which conduits communicate with the conduit 40, in turn, connected with the source of compressed air 41 and are controlled by the valves 91v, 92v, 93v, and 94v operating to establish or to interrupt communication thereof through the conduit 95 with the analog computer. These pressure reducers are also adjustable for the purposes explained in the next paragraph. Four gauges designated respectively by the numerals 96, 97, 98, and 99, and connected to the analog computer in a manner illustrated in FIG. 9, with their connecting conduits being controlled with the aid of valves 96v, 97v, 98v, and 99v, respectively, to have during the test only one gauge corresponding to the tested point of operation be in communication with said analog computer 72.

It is to be understood that provision of the branch conduits 91–94 with pressure reducers 91r–94r and valves 91v–94v is necessary only when the dials of the gauges 96–99 are identical with the exception of the markings for limits of permissible deviations. Since the prescribed mixture ratio for each of the points of operation will be different, preadjusting of the pressure reducers 91r–94r to add to the signal of the analog computer additional pressure to bring the hand of the respective gauges to the zero point when the carburetor performs ideally would eliminate the necessity of specially graduating each dial. On the other hand, should it be desired for any reason to graduate specially the dial of each of the gauges 91–94, use of such branch conduits as well as of the pressure reducers and valves interposed therein is not necessary, and such part of the construction may be eliminated. In such a construction, adjustment of the gauges is done as in the construction of FIG. 4.

In accordance with the invention, the tested carburetor 22 is tested for each of the four points without being moved from its position on a stand 80 and merely by manipulating the control explained above. In the actual installation, such controls, particularly the pressure reducers, are adjusted in advance. Therefore, substantially only manipulation of the valves 82v–95v is necessary to cause switching of the test from point to point.

The entire test operation is performed very rapidly. It takes only a few seconds for the system to come to a balanced position at each of the four points of operation, with the longest period for coming to a balanced position required in the test for idle operation. The time period for test at all four points is usually less than one minute. The gauges 94–97 have dials graduated in the same manner as the dial 74 of the indicator 73, illustrated in FIG. 9.

The construction of FIG. 11 is a multiple-point pneumatic system similar to the construction illustrated in FIG. 10 and adapted to test carburetors at the same four points of carburetor operation. This particular system makes it possible to make such test with reduced number of critical flow venturi meters as well as mixture ratio indicating gauges. These devices are rather expensive and reduction in their number without affecting function of the apparatus is very desirable. In accordance with the invention, the three critical flowmeters 110, 111, and 112 are adapted to establish the required air flows for idle, off-idle, and part-open throttle point of operations of carburetor and to have the throttle of the carburetor set to produce the specified manifold vacuum by proper presetting of the pressure regulators 105v, 106v, 107v and 108v, respectively. However, for the purposes of test at the wide-open throttle condition, both the critical flow venturi meters 111 and 112 are put in operation.

For operating the throttle positioner for the wide-open throttle operation and setting the carburetor throttle into the position to produce the specified manifold vacuum, a fourth pressure reducer 113r is still required. Referring to the chart of column 8, lines 57–67, it will be noted that combined operation of the critical flow nozzles for off-idle and part-open throttle operation will produce only 12 lbs./ min. air flow. Since that chart specifies the flow of 15 lbs./ min. air flow for wide-open throttle operation, it may be necessary in the situations of such nature to use for off-idle and part-open operations critical flowmeters producing 5 lbs./min. and 9 lbs./min. air flows respectively, and for the wide-open throttle a critical flow nozzle producing air flow of 14 lbs./min., in order to have the two venturi meters produce exactly the air flow specified for the full-open throttle operation. Other values, particularly manifold pressure and required air-fuel ratio, as well as permissible deviations, would have to be recomputed or determined by laboratory tests accordingly, and this is usually done by the carburetor manufacturers for such purposes.

Another important feature of difference of the construction of FIG. 11 as compared with the construction of FIG. 10 is the use of a single gauge for indicating mixture ratios for each of the four points of tests.

It should be understood at this point that while the air flows at various points of carburetor operation differ very substantially from point to point, the mixture ratios do not vary in the same substantial manner. Since in addition to the zero point indicating ideal operation of the carburetor it is also necessary to have on the dial of the gauge space for marking percentage of deviation from the ideal operation, the markings for each point of operation would overlap and become unuseable for the purposes of the test. This is the reason why in the construction of FIG. 10 four separate gauges, one gauge for each point of operation, are provided. In accordance with the invention, means are provided whereby proper reading is made on a single gauge in which four ranges of operation are graduated. A dial of such a gauge is illustrated in FIG. 14.

Referring specifically to FIG. 14, the dial 116 of said gauge 115 is graduated to have marked thereon four ranges corresponding to the four points of the operational range of the carburetor at which the tests are conducted and for which the apparatus is adjusted. The markings of the four ranges are disposed side by side, with each one having a zero point and graduation corresponding to 4% deviation in either direction from the zero point. The limits of permissible deviations are marked with a distinctive heavy line at points corresponding to the prescribed limits. For a specific illustration, it may be seen that the limits marked in each of the four ranges on the dial 116 illustrated in FIG. 14 corresponds to the specifications given in the chart in column 8, lines 57–67. For instance, the limits of deviation for idle operation are marked at 2% on both sides of the zero point.

In order to have the indications of the gauge 115 register or coincide in each of the ranges marked on the dial 116, means are provided to add to the signal of analog computer 72 such corrective pressure signal as to bring the hand of the gauge in the range at which test is conducted to the zero point at ideal operation of the test carburetor. In the present embodiment, such means are exemplified by the branch conduits 91, 92, 93, and 94 having operatively interposed therein pressure regulations 91r, 92r, 93r, and 94r, as well as valves 91v, 92v, 93v, and 94v. Said conduits communicate with the analog computer 72 through conduit 95.

In adjusting the apparatus for test at four operation points, and starting with the idle operation, the pressure reducer 91r is adjusted to have the hand 114 of the gauge 115 come to zero mark of the idle range when at the prescribed condition for such operation the air-fuel ratio is 11:1. A corresponding adjustment of the pressure reducer 92r is made to have the hand 114 of the gauge come to the zero mark of the "off-idle" range on the dial when at off-idle operation with the specified air flow and manifold pressure the air-fuel ratio is 14:1. Adjustments of the pressure reducers 93r and 94r are made in a similar manner for part-open throttle and wide-open throttle operation, respectively. Valves 91v–94v are used to have only one such valve open during the test at the corresponding point of operation.

It will be understood that use of similar branch conduits and pressure reducers in the construction of FIG. 10 is necessary only if the gauges 96–99 and their dials are identical. The adjustments of such pressure reducers for each of the corresponding gauges are then relatively small. However, if the separate dials for each of the gauges such as 96–99, respectively, are specially graduated to compensate for the relatively small difference in the signal produced by the analog computer 72 because of the difference in the mixture ratio at each of the four points of operation, the branch conduits 91–94 as well as the pressure reducers 91r–94r and the valves 91v–94v and the conduit 95 may be eliminated, as was done in the construction of FIG. 4.

In the apparatus described above, the sensible signals produced by the devices for measuring the rate of air flow and the rate of the fuel flow, as well as by the analog computer, are of the pneumatic nature, and the various indicating instruments used therein are, in effect, specially graduated pressure gauges. It will be understood, however, that such sensible signals may be also hydraulic, or electric, requiring corresponding indicating instruments. Electrical signals are particularly advantageous as providing possibilities of precise measurements by reliable and relatively inexpensive instrumentation. One such system is illustrated in a diagrammatic manner in FIG. 15.

The electrical system of FIG. 15 is substantially identical to the system described in FIG. 11 with respect to its "operation conditions reproducing system." The carburetor receiving stand thereof, the critical flow venturi meters and their controls, the chamber in which such venturi meters are installed, the throttle positioner and its controls such as pressure regulators or reducing valves, are substantially the same as in the construction of FIG. 11. For ease of understanding, such common components are designated by the same numerals.

The "measuring and mixture ratio determining and indicating system" of the apparatus of FIG. 15 includes components substantially similar to those used in the apparatus of FIG. 11 but with provisions to convert their pressure output into electric voltage output proportional to such pressure output, thus providing for measuring such converted electrical output with the aid of suitable voltmeters graduated in a manner to relate the voltage output respectively to the rate of air flow, the rate of fuel flow, and, finally, to the mixture ratio. As indicated in FIG. 15, the absolute pressure transducer 120 is used in place of the absolute pressure transmitter 45 of the apparatus of FIG. 11. The absolute pressure transducer receives through the conduit 47 the pressure signal representing the absolute pressure within the chamber, and converts it into electric output related to the rate of air flow which is indicated by the specially graduated voltmeter 121. This electric output is also impressed through the conductors 123 and 124, on the electrical-pneumatic transducer 125, in order to convert the electric output thereof into proportional pressure for the purpose of transmitting such pressure to the lower portion of the throttle positioner cylinder 30 through the conduit 126 for the same purposes as in the apparatus of FIG. 11 and other apparatus previously described.

In such electrical systems the pressure-responsive throttle positioner 30 could be replaced by a similar device including an electrical actuating device adapted to drive the shaft 56 connected to the throttle shaft 57 directly, and receiving operating current from an electrical transmitter substituted for the electrical-pneumatic transducer such as 125. This would eliminate the need for the compressed air supply and the related pressure regulators and valves, and substituting same by a voltage divider network such as 133.

The output of the fuel flowmeter 62 is amplified by the amplifier 127 and converted into proportional voltage transmitted to a suitably graduated voltmeter 128 for indication of the rate of fuel flow.

The respective voltages from the absolute pressure transducer 120 and from the amplifier transducer 127 representing, respectively, the rate of the air flow and the rate of the fuel flow are impressed through the conductors 123 and 124 on the analog computer 130 adapted to receive electric signals and to divide one by the other, giving the ratio thereof, and to produce a resulting electric signal representing the mixture ratio. Such resulting electric signal is transmitted to the specially graduated voltmeter 131 for evaluation in a manner similar to that described with respect to the system of FIG. 11. The dial of a voltmeter 131 may be graduated in a substantially similar manner as the dial 116 for the apparatus of FIG. 11. Accordingly, in order to enable marking all four operation points on a single dial, a voltage divider network 133 is provided in order to add to the voltage produced by the analog computer 130 in each of the four ranges such additional signal as to move the hand of the voltmeter to the next range of indications on its dial in substantially the same manner as in the construction of FIG. 11.

One actual installation comprising three stations, each representing the apparatus such as illustrated in FIG. 11, is shown in FIGS. 1–3. Such installation is provided in order to speed up the test operations and to utilize operator's time more efficiently without unduly shortening the time of the test for each separate carburetor. In the installation shown in FIG. 1, three substantially identical test apparatus are installed together to be operated by a single operator in a manner that while the carburetors on the two stations are stabilizing in operation on particular operation points, the operator is installing the carburetor of the third station or is removing and making the carburetor from another station.

In the last operation, the operator observes position of the indicating hand 114 on the mixture ratio indicator 115 and takes as acceptable the carburetor for which the hand of the mixture ratio indicator is stabilized in a position between the marking of the corresponding range, determining the limits of permissible deviations. On the other hand, if the indicator hand 114 is stabilized beyond the prescribed limits, operator separates and rejects such carburetor as unacceptable. If desired, a ticket indicating the results of the test may be cemented or otherwise attached to the tested carbureor. Such tickets may be attached either to all tested carburetors or only to hose which were rejected. Also, visual indications of the results of the test by green and red light may be attained automatically as in the previously described pneumatic systems.

In installing a test carburetor on the stand, operator places the carburetor on the holding fixture best shown in FIGS. 2 and 3. The holding fixture, generally designated by the numeral 140, comprises a base on which there are provided dowell pins such as 141 adapted to locate the test carburetor in the proper position in the holding fixture by entering the corresponding holes in the body of the carburetor. A rubber gasket 142 provided with an aperture 143 registering with the discharged aperture of the test carburetor, is provided on the top surface of the holding fixture. Clamping hooks such as those designated by the numeral 144 are adapted to engage the lower flange of the carburetor and to press the same against the gasket 142 to seal the carburetor on the fixture 140. The fuel line 61 is then connected to the test carburetor 22 with the aid of a spring pressed coupling 145 which is securely held in place during the test by pneumatic pressure supplied to the device through the line 146. By such a construction, the fuel is supplied to the float chamber of the test carburetor under a predetermined test pressure.

The coupling adapted to connect the shaft 56 of the pulley 54 to the carburetor throttle comprises a spring pressed crank 147 carried on the end of the shaft 56 and including a stud 148 adapted to enter the hole in the crank of the carburetor shaft 57. By virtue of such a construction, very rapid connection of the carburetor throttle of the throttle positioner is attained. The operator merely pushes this spring pressed crank 147 toward the pulley, and rotating by hand the shaft 56 of the pulley with the aid of the knurled knob 58 brings the stud of the crank in registry with the hole of the crank on the carburetor shaft 57. Releasing his hold on the crank 147, the operator permits the stud thereof to enter the hole in the carburetor shaft crank and thus become connected to the carburetor throttle.

For setting the station in operation, the operator presses two buttons 150, one with each hand for safety, to have the test carburetor 22 clamped in place by the hook fingers 144, see FIG. 2, with other connections such as compressed air and fuel being made automatically. At the same time, a control circuit, not shown, operates to open the preset idle pressure regulator and the analog gain regulator and the critical flow venturi meter valve, all for the idle operation of the station. After approximately twenty seconds of such operation, the conditions stabilize and the hand 114 of the mixture ratio indicator 115 stabilizes within the idle range on the gauge dial 116 showing whether operation of the carburetor is set and what is the percentage of deviation of such performance from the prescribed standard.

Pressing the button 151 shuts off previously opened two regulators and the idle venturi meter valve and opens the off-idle regulator and the off-idle analog gain regulator and the off-idle critical flow venturi meter valve. After a few seconds of operation, usually shorter than that required for idle operation, the system comes to a balance and the hand 114 of the ratio indicator 115 sets within the markings of the off-idle operation on the dial indicating performance of the test carburetor in that particular range. Pushing to button 152 shuts off previously opened two regulators and the off-idle venturi meter and opens the part-throttle pressure regulator, the analog gain regulator, as well as the part-throttle critical flow meter valve, whereupon the dial indicates performance of the test carburetor in this particular range. Pushing the button 153 closes the previously opened valves except the valve of the critical flow venturi meter and opens the wide-open throttle pressure regulator, the wide-open throttle analog gain regulator and a previously closed critical flow venturi meter valve used in one of the prior tests to form a new air flow of two critical flow venturi meters operating together, whereupon the dial indicates performance of the test carburetor in the wide-open throttle range. Pushing the button 154 operates to close all previously opened valves and to unclamp the test carburetor for manual removal from the holding fixture.

The entire test conducted with the above procedure on the installation such as illustrated in FIG. 1 is very rapid and takes less than one minute, which time is well within the requirements of production testing.

The control circuits, which may be pneumatic or electric, for operating the above described control valves are devices well known in the art and therefore they need not be described in detail herein.

The above-described manually operated control system can be made automatic in its sequence by adding a suitable circuit which is well known in the art, thereby permitting the operator to leave the test installation after pressing the first button. With such a system, a visual signal device is added which is adapted to receive and to save the test results until switched off by the operator. Further automation of the system or plurality of them may also be done with the aid of suitable computers in a manner useable in such installations, such, for instance, as to control a relatively large number of test installations and to make corrections for the uncontrollable parasitic influences such as a barometric change.

FIG. 16 illustrates in a diagrammatic manner an apparatus for determining the mixture ratio supplied to an operating engine by its carburetor attached thereto and providing continuous indication of such ratio. The apparatus of FIG. 16 differs from the previously described carburetor testing apparatus primarily in its indicating function since its mixture ratio indicator thereof indicates the actual mixture ratio rather than compliance of the carburetor performance with the prescribed standard therefor and the degree of deviation therefrom. Furthermore, in the construction of FIG. 16, the operation conditions reproducing system is omitted since the apparatus is connected directly to an operating engine. In addition, by constantly giving indication of the carburetor performance, the apparatus of FIG. 16 thus indicates the operation of the engine and enables the operator to detect well in advance of any serious result any abnormal tendency in the operation of the engine.

Referring specifically to FIG. 16, the apparatus illustrated therein comprises a linear air flowmeter 160 operatively interposed between the air cleaner 161 and the intake aperture of the carburetor 162. Devices suitable for such purposes are known in the art. A linear air flowmeter manufactured by Meriam Instrument Co. of Cleveland, Ohio, has proved to be satisfactory for such purposes.

The signal related to the rate of air flow is transmitted to the pneumatic amplifier 64A through conduits 167 and 168. The operating pressure for the secondary pressure system of the pneumatic amplifier 64A is supplied thereto from the source 175 of compressed air through conduits 176 and 178 at the desired pressure adjusted with the aid of pressure regulator 166 operatively interposed in the conduit 176. The signal so amplifier is transmitted through the conduit 165 to the rate of air flow indicator 163 and through the branch conduit 164 to the analog computer 72 as being a signal related to or indicating the rate of air flow through the carburetor to the engine. It will be understood at this point that in the apparatus of FIG. 16, the engine 169 performs the funtion similar to that of the vacuum pump 21 of the construction of FIG. 4 andother apparatus described above.

The fuel supply 170 supplies through the conduit 171 the fuel flowing through the carburetor for operation of the engine, delivering such fuel to the carburetor 162 in the usual manner. A pressure regulator 172 and a mass flowmeter 173 are operatively interposed in the conduit 171. The signal produced by the mass flowmeter 173, being related to or indicative of the rate of the fuel flow, is impressed on the primary pressure system of the pneumatic amplifier 174 for amplification through the conduits 67 and 68. The pressure for the secondary pressure system of the amplifier 174 to be modified in the desired proportion to the changes of the primary pressure is supplied to the secondary pressure system of the amplifier 174 from the compressed air supply 175 through the conduits 176 and 177, and from there through the conduit 179 to the rate of fuel flow indicator 180. Conduit 181 conveys the same signal to the analog computer 72.

The analog computer 72 performs its function of dividing the value of the signal indicating the rate of air flow by the value of the signal indicating the rate of fuel flow in the same manner as in the construction of FIG. 4, giving the resulting third signal representing the ratio of such values, which ratio is the mixture ratio, in the present embodiment the air-fuel ratio, and conveys said third signal through the conduit 183 for continuous and direct indication thereof on the mixture ratio indicator 184.

As in the apparatus previously described, the air supply from the source 175 of compressed air is supplied also to the analog computer 72 through the conduit 182 at the same adjusted pressure as attained with the use of the pressure regulator 166 for the purposes of operating the pneumatic amplifiers 64A and 174.

It will be noted that the dial 185 of the mixture ratio indicator 184 is graduated in units indicating the mixture ratio as such. Accordingly, it is graduated in corresponding units. Graduations from the initial point of 7:1 to final point of 18:1, amply cover the practical range of useable mixture ratios. Such graduations are used for the reason that conditions of operation of the engine may vary continuously rather than be stabilized as in the operation of the apparatus shown in FIG. 4, and other apparatus used for production testing.

It will also be understood that while the apparatus illustrated in FIG. 16 is of pneumatic character, i.e. having the sensible signals produced by the rate of air flow measuring device and by the rate of fuel flow measuring device, as well as by the analog computer, in the form of pneumatic pressure, an apparatus performing the same functions may also be of the nature to have such sensible signal produced in the form of electric output and indicatable on correspondingly graduated electrical measuring devices such as specially graduated voltmeters. Such an apparatus can be produced in accordance with the disclosure made in the description of FIG. 15 above.

The mixture ratio indicating system of the nature illustrated in FIGS. 16 and 17 may be profitably used, for instance, in connection with large gasoline engines, particularly in aircraft, for the purposes of both safety and economy. It may also be used in large diesel engine installations where it would give directly and continuously a reading more reliable for quick evaluation of the engine performance than indication of the rate of fuel flow only could give. The advantages may be derived from the use of the above system in gas engines.

There is thus provided method and apparatus whereby the objects of the present invention and numerous additional advantages are attained.

We claim:

1. In an apparatus for determining the mixture ratio produced by a carburetor and producing direct and continuous indication related thereto, means to measure the actual rate of air flow to produce a continuous sensible signal related to said rate, means to measure the actual rate of the fuel flow through the carburetor to produce a second continuous sensible signal related to said rate of fuel flow, a device adapted to receive and to divide the value of one signal by the value of the other signal and to produce a third continuous signal related to the ratio of said two signals, and an indicating device responsive to said third signal and adapted to give continuous indication related to the mixture ratio, the device for dividing the values of the sensible signals one by the other being in the nature of an analog computer force bridge.

2. In an apparatus for production testing of carburetors to determine the amount of deviation of the mixture ratio produced by a test carburetor at predetermined air flow and manifold vacuum from a prescribed standard therefor, means adapted to produce the predetermined air flow, pressure-responsive means adapted to set the carburetor throttle into the position to produce on the downstream side of the carburetor throttle the predetermined vacuum, means adapted to measure continuously the air flow through the test carburetor and to produce a pneumatic signal related to the air flow, means adapted to measure continuously the resulting fuel flow through the carburetor and to produce a second pneumatic signal related to the fuel flow, means adapted to receive both of said signals and to divide the value of one signal by the value of the other and thus to produce a third continuous pneumatic signal related to the ratio of said two signals, and a pressure-responsive indicating device having a dial graduated in units related to mixture ratio, said pressure-responsive device being adapted to receive said third pneumatic signal and to give continuous indication responsive to said signal.

3. The test apparatus defined in claim 2, with the means adapted to produce the predetermined air flow through a test carburetor being in the form of flow limiting means.

4. The test apparatus defined in claim 2, with the means adapted to set the throttle of the test carburetor into the position to produce at the predetermined air flow the predetermined vacuum on the downstream side of the carburetor throttle being in the form of a cylinder having a piston therein responsive to the pressure difference between a pressure related to the air flow and a preselected adjustable pressure, and drivingly connected to the carburetor throttle.

5. An apparatus for production testing of carburetors to determine the amount of deviations of the mixture ratio produced by a test carburetor from a prescribed standard therefor at a plurality of predetermined points of its operation range, said apparatus comprising a uniform operation conditions reproducing system adapted to reproduce selectively and successively through each test carburetor the predetermined air flow, and the predetermined vacuum on the downstream side of the throttle of the test carburetor, for each of said points of operation; and a flow measuring and mixture ratio determining and indicating system adapted to measure, in the process of the test for each one of the operation points, the air flow and the fuel flow induced through the test carburetor and to produce separate sensible signals of electrical nature related to said flows, respectively, with the fuel flow producing hydraulic effect linearly proportional to the fuel flow and convertible into electric signal, means in the nature of an analog computer adapted to receive said signals and to divide the value of one signal by the value of the other to produce a ratio of said signals representing the mixture ratio within the respective point of operation, and indicating means for each of said points of operation responsive to the mixture ratio signal within said points of operation, respectively.

6. The apparatus defined in claim 5 with the predetermined air flow through the carburetor being produced with the aid of a vacuum pump with the means limiting the air flow through the carburetor at predetermined manifold vacuum to a predetermined air flow rate being in the form of a plurality of maximum flow venturi meters freely insertable and removable from their operative positions.

7. An apparatus for production testing of carburetors to determine the amount of deviations of the mixture ratio produced by a test carburetor from a prescribed standard therefor at a plurality of predetermined points of its operation range, said apparatus comprising an operation conditions reproducing system adapted to reproduce selectively and successively the predetermined air flow, and the predetermined vacuum on the downstream of the test carburetor, for each of said points of operation; and a flow measuring and mixture ratio determining and indicating system adapted to measure, in the process of the test for each one of the operation points, the air flow and the fuel flow and to produce separate sensible signals related to said flows, respectively, means adapted to receive said signals and to divide the value of one signal by the value of the other signal to produce a ratio of said signals representing the mixture ratio within the respective point of operation, and indicating means for each of said points of operation responsive to the mixture ratio signal within points of operation, respectively, with the mixture ratio indicating means being in the form of an indicating device including a dial having adjacent but separate graduated range for each of the operation points, each of said ranges having a middle point mark corresponding to the ideal operation of a test carburetor within the respective points of operation and markings at both sides of said mark showing deviation from the ideal operation, and adjustment means adapted to add to the third signal in each one of the plurality of tests at separate points of operation such increment as to bring the indication at each test point to its respective mark indicating ideal operation for a test carburetor so operating.

8. An apparatus for production testing of carburetors to determine the amount of deviations of the mixture ratio produced by a test carburetor from a prescribed standard therefor at a plurality of predetermined points of its operation range, said apparatus comprising an operation conditions reproducing system adapted to reproduce selectively and successively the predetermined air flow, and the predetermined vacuum on the downstream side of the test carburetor, for each of said points of operation; and a flow measuring and mixture ratio determining and indicating system adapted to measure, in the process of the test for each one of the operation points, the air flow and the fuel flow and to produce separate sensible signals related to said flows, respectively, means adapted to receive said signals and to divide the value of one signal by the value of the other signal to produce a ratio of said signals representing the mixture ratio within the respective point of operation, and indicating means for each of said points of operation responsive to the mixture ratio signal within said points of operation, respectively, with the mixture ratio indicating means being in the form of an indicating device including a dial having adjacent but separate graduated range for each of the operation points, each of said ranges having a middle point mark corresponding to the ideal operation of a test carburetor within the respective points of operation and markings at both sides of said mark showing deviation from the ideal operation, and adjustment means adapted to add to the third signal in each one of the plurality of tests at separate points of operation such increment as to bring the indication at each test point to its respective mark indicating ideal operation for a test carburetor so operating, with the signal-producing means being adapted to produce signals of electric character.

9. A venturi meter adapted to be operated critically and a structure adapted to receive the same including a wall, said venturi meter comprising a cylindrical body having an intake end and a delivery end, a cylindrical nest in said wall adapted to receive said body, sealing means adapted to seal said body at said nest, and a flange on the intake end of the body to locate the venturi in the operative position of said venturi meter when operative pressure is applied on the intake side of the body, said venturi meter being freely insertable into said nest to be retained in place by operation of pneumatic pressure.

10. In an apparatus for production testing of substantially identical carburetors, each having a throttle, for determining the mixture ratio produced by test carburetors, means adapted to receive each test carburetor and to hold said carburetor in a test position, operation conditions reproducing system for reproducing uniformly in each test carburetor the same predetermined test conditions and comprising a venturi meter adapted to be operated critically and to produce a predetermined air flow through the test carburetor, pressure-responsive means drivingly connected to the carburetor throttle and adapted to set it into a position at which the flow through the test carburetor stabilizes at a predetermined flow and a predetermined absolute pressure on the downstream side of the carburetor throttle, thereby subjecting the test carburetors to test conditions of predetermined magnitude and uniform from carburetor to carburetor.

11. In an apparatus for production testing of carburetors for determining the mixture ratio produced by a test carburetor, an operation conditions reproducing system adapted to receive a test carburetor having a throttle and to hold said carburetor in a test position, means adapted to produce a predetermined air flow through the carburetor and pressure-responsive means drivingly connected to the carburetor throttle and adapted to set it into a position at which also a predetermined absolute pressure occurs on the downstream side of the carburetor throttle, thereby inducing through the test carburetor such flow of fuel as would occur therethrough in an operating engine at the same air flow and manifold absolute pressure, with the pressure-responsive throttle-setting means responding to a pressure differential between a predetermined reference pressure and the pressure related to the air flow, which differential is known by preliminary measurements to set the throttle through said pressure-responsive means into the position producing at the predetermined air flow the desired manifold vacuum.

12. An apparatus for production testing of carburetors to determine the amount of deviations of the mixture ratio produced by a test carburetor from a prescribed standard therefor at a plurality of predetermined points of the operation range of the carburetors, said apparatus comprising an operation conditions reproducing system adapted to reproduce selectively and successively in each test carburetor the predetermined air flow, and the predetermined vacuum on the downstream side of the test carburetor, for each of said points of operation; and a flow measuring and mixture ratio determining and indicating system adapted to measure, in the process of the test for each one of the operation points, the air flow and the fuel flow through the test carburetor and to produce separate sensible signals related to said flows, respectively, means adapted to receive said signals and to divide the value of one signal by the value of the other signal to produce a ratio of said signals representing the mixture ratio within the respective point of operation, and indicating means for each of said points of operation responsive to the mixture ratio signal within said points of operation, respectively, with the signal-producing means being adapted to produce signals of electric character and with the means to set the throttle of the test carburetor into the position to produce at the prescribed air flow the predetermined vacuum on the downstream side of the carburetor throttle being in the form of an electrical actuating device operated by an electrical transmitter operated by the signal representing the rate of air flow and directly connected to the throttle.

References Cited
UNITED STATES PATENTS

| | | | |
|---|---|---|---|
| 2,140,562 | 12/1938 | Snow | 73—3 |
| 2,393,708 | 1/1946 | Reichel | 73—196 |
| 2,394,284 | 2/1946 | Berges | 73—196 |
| 2,526,635 | 10/1950 | Cochran | 73—196 |
| 2,597,231 | 5/1952 | Edelen | 73—118 |
| 2,755,663 | 7/1956 | Smith et al. | 73—3 X |

JERRY W. MYRACLE, Primary Examiner

U.S. Cl. X.R.

73—3